United States Patent
Kikuchi et al.

(10) Patent No.: US 9,035,614 B2
(45) Date of Patent: May 19, 2015

(54) ASSEMBLED BATTERY CHARGING METHOD, CHARGING CONTROL CIRCUIT, AND POWER SUPPLY SYSTEM

(71) Applicant: PANASONIC CORPORATION, Osaka (JP)

(72) Inventors: Tomoya Kikuchi, Aichi (JP); Tomohisa Suzuki, Shizuoka (JP); Yasuyuki Yoshihara, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/357,491

(22) PCT Filed: Nov. 14, 2012

(86) PCT No.: PCT/JP2012/007293
§ 371 (c)(1),
(2) Date: May 9, 2014

(87) PCT Pub. No.: WO2013/073175
PCT Pub. Date: May 23, 2013

(65) Prior Publication Data
US 2014/0300324 A1    Oct. 9, 2014

(30) Foreign Application Priority Data

Nov. 17, 2011   (JP) ................................. 2011-251331

(51) Int. Cl.
*H02J 7/00*   (2006.01)
*H02J 7/04*   (2006.01)
*H01M 10/44*  (2006.01)

(52) U.S. Cl.
CPC ............ *H02J 7/0013* (2013.01); *H01M 10/44* (2013.01); *H01M 10/441* (2013.01); *H02J 7/007* (2013.01); *H02J 7/0057* (2013.01)

(58) Field of Classification Search
CPC ........................................................ H02J 7/1423
USPC ....................................................... 320/126
See application file for complete search history.

(56) References Cited

U.S. PATENT DOCUMENTS

2011/0204850 A1*  8/2011  Kaino ........................... 320/116
2012/0139491 A1*  6/2012  Eberhard et al. ............. 320/118

FOREIGN PATENT DOCUMENTS

| JP | 05-336675 A | 12/1993 |
| JP | 10-32020 A | 2/1998 |
| JP | 11-89104 A | 3/1999 |
| JP | 2010-160955 A | 7/2010 |

OTHER PUBLICATIONS

International Search Report issued in PCT/JP2012/007293, dated Jan. 15, 2013, with English translation.

* cited by examiner

*Primary Examiner* — Edward Tso
*Assistant Examiner* — Ahmed Omar
(74) *Attorney, Agent, or Firm* — McDermott Will & Emery LLP

(57) ABSTRACT

A method for charging an assembled battery including series circuits connected in parallel, each of the series circuits including series-connected lead storage batteries, using a single charger is provided. The method includes: a first step of obtaining a first index value, corresponding to a resistance value of a first series circuit with a correlative relationship, the first series circuit having a lowest resistance value; a second step of obtaining a second index value corresponding to a resistance value of a second series circuit with a correlative relationship, the second series circuit having a highest resistance value; a third step of performing normal charging, in which the assembled battery is charged with a first amount of charge corresponding to the first index value; and a fourth step of performing refresh charging, in which the assembled battery is charged with a second amount of charge corresponding to the second index value.

16 Claims, 12 Drawing Sheets

FIG. 3

| FIRST STAGE CHARGING TIME T1 [h] \ BATTERY TEMPERATURE Tp1 [°C] | FORCE-IN CHARGING TIME Tf | | |
|---|---|---|---|
| | $0 \leq Tp1 < 15$ | $15 \leq Tp1 < 45$ | $45 \leq Tp1 < 55$ |
| $1.0 \leq T1 < 1.5$ | 3.0 | 1.0 | 0.5 |
| $1.5 \leq T1 < 2.0$ | 3.5 | 1.5 | 1.0 |
| $2.0 \leq T1 < 2.5$ | 4.0 | 2.0 | 1.5 |

FIG. 4

| FIRST STAGE CHARGING TIME T1 [h] \ BATTERY TEMPERATURE Tp2 [°C] | REFRESH CHARGING TIME Tr | | |
|---|---|---|---|
| | $0 \leq Tp2 < 15$ | $15 \leq Tp2 < 45$ | $45 \leq Tp2 < 55$ |
| $1.0 \leq T1 < 1.5$ | 3.5 | 3.0 | 2.5 |
| $1.5 \leq T1 < 2.0$ | 4.0 | 3.5 | 3.0 |
| $2.0 \leq T1 < 2.5$ | 4.5 | 4.0 | 3.5 |

FIG. 11

| | FORCE-IN CHARGING TIME Tf | | |
|---|---|---|---|
| FIRST STAGE CHARGING TIME T1 [h] \ RESISTANCE Rx1 | R1≦Rx1<R2 | R2≦Rx1<R3 | R3≦Rx1<R4 |
| 1.0≦T1<1.5 | Tx11 | Tx12 | Tx13 |
| 1.5≦T1<2.0 | Tx21 | Tx22 | Tx23 |
| 2.0≦T1<2.5 | Tx31 | Tx32 | Tx33 |

FIG. 12

| | REFRESH CHARGING TIME Tr | | |
|---|---|---|---|
| FIRST STAGE CHARGING TIME T1 [h] \ RESISTANCE Rx2 | R1≦Rx2<R2 | R2≦Rx2<R3 | R3≦Rx2<R4 |
| 1.0≦T1<1.5 | Tx41 | Tx42 | Tx43 |
| 1.5≦T1<2.0 | Tx51 | Tx52 | Tx53 |
| 2.0≦T1<2.5 | Tx61 | Tx62 | Tx63 |

ASSEMBLED BATTERY CHARGING METHOD, CHARGING CONTROL CIRCUIT, AND POWER SUPPLY SYSTEM

RELATED APPLICATIONS

This application is the U.S. National Phase under 35 U.S.C. §371 of International Application No. PCT/JP2012/007293, filed on Nov. 14, 2012, which in turn claims the benefit of Japanese Application No. 2011-251331, filed on Nov. 17, 2011, the disclosures of which Applications are incorporated by reference herein.

TECHNICAL FIELD

The present invention relates to a method of charging an assembled battery including plural lead storage batteries, a charging control circuit, and a power supply system. More particularly, the present invention relates to techniques of charging an assembled battery favorably using a single charger, the assembled battery including series circuits connected in parallel, each of the series circuits including one or more lead storage batteries connected in series.

BACKGROUND ART

Due to recent improvements in charge-discharge characteristics of a lead storage battery, there is renewed interest in this type of battery as a high performance power supply in industrial areas where expensive lithium ion secondary batteries make poor business sense. Specialized electric vehicles such as electric carts and forklift trucks, and so on, are handled in these industrial areas rather than portable battery-equipped devices. Further, in these industrial areas, systems for recycling battery-equipped device main bodies and lead storage batteries are well established.

A charge acceptance of a lead storage battery is affected by a temperature to which the battery is exposed. When the lead storage battery is exposed to a low temperature, for example, reductions occur in electrolyte fluidity and electrode reactivity. Accordingly, reaction resistance increases, leading to a reduction in the charge acceptance. Here, the reaction resistance means how easily an electrochemical reaction occurs in the battery. When the battery is exposed to a low temperature, for example, the reaction resistance increases, since an electrochemical reaction is less likely to occur. Conversely, when the battery is exposed to a high temperature, the reaction resistance decreases, since an electrochemical reaction is more likely to occur.

When the lead storage battery is continuously undercharged, sulfation (a phenomenon whereby lead sulfate obtained as a discharge product becomes inactive such that a battery capacity is impaired) advances. When the lead storage battery is continuously overcharged, on the other hand, grid corrosion occurs particularly in a positive electrode, leading to a reduction in life. To charge the lead storage battery appropriately, therefore, it is necessary to learn the temperature to which the lead storage battery is exposed precisely and reflect the learned temperature in charging conditions.

Patent Document 1 describes controlling charging and discharging by measuring each temperature to which a lead storage battery is exposed and calculating a charging control voltage after reflecting a resulting measured value in an equation having the temperature as a variable. Patent Document 2 describes multistage constant current charging having three or more stages, in which a charging current is reduced and a following stage of the charging is started when a lead storage battery reaches a predetermined end-of-charge voltage, and a final stage of the charging is performed until a predetermined time elapses after the lead storage battery reaches the end-of-charge voltage (a charging current In, where n is the number of charging stages, corresponds to I1>I2> . . . >In−1). In Patent Document 2, the charging is controlled appropriately by increasing the end-of-charge voltage as the temperature to which the lead storage battery is exposed decreases.

Patent Document 1: Japanese Patent Application Publication H10-032020

Patent Document 2: Japanese Patent Application Publication H11-089104

SUMMARY OF THE INVENTION

Patent Documents 1 and 2 exhibit favorable effects when applied to a single lead storage battery or an assembled battery including a single series circuit in which lead storage batteries are connected in series. In the specialized electric vehicles described above, however, a power supply is often constituted by an assembled battery including the above-mentioned series circuits connected in parallel. In this type of assembled battery, temperatures to which the lead storage batteries are exposed are likely to differ among the series circuits.

When charging is performed under identical conditions without taking these differing temperature conditions into account, however, the lead storage batteries of a series circuit that is exposed to a high temperature and therefore exhibits a high charge acceptance are likely to be overcharged, while the lead storage batteries of a series circuit that is exposed to a low temperature and therefore exhibits a low charge acceptance are likely to be undercharged. Hence, it is believed that a configuration in which a charger is provided for each series circuit, such as that described in WO 2010/079563, cannot help being employed. With this configuration, however, the increase in the number of chargers leads to a corresponding increase in cost. Moreover, a larger space has to be secured for storage in the interior of the specialized electric vehicle.

The present invention has been designed to solve these problems, and an object thereof is to provide an assembled battery charging method, a charging control circuit, and a power supply system with which an assembled battery may be charged without being either overcharged or undercharged using a single charger, the assembled battery including series circuits connected in parallel, each of the series circuits including one or more lead storage batteries connected in series.

An assembled battery charging method according to an aspect of the present invention is a method of charging an assembled battery using a single charger, the assembled battery including series circuits, each of the series circuits including one or more lead storage batteries connected in series, the series circuits being connected in parallel, the method includes: a first step of obtaining a first index value, which is an index value corresponding to a resistance value of a first series circuit with a correlative relationship, the first series circuit having a lowest resistance value among the series circuits; a second step of obtaining a second index value, which is an index value corresponding to a resistance value of a second series circuit with a correlative relationship, the second series circuit having a highest resistance value among the series circuits; a third step of performing normal charging, in which the assembled battery is charged with a first amount of charge corresponding to the first index value; and a fourth step of performing refresh charging, in which the assembled battery is charged with a second amount of charge corresponding to the second index value, in succession to the third step.

A charging control circuit according to an aspect of the present invention charges an assembled battery using a single charger, the assembled battery including series circuits, each of the series circuits including one or more lead storage batteries connected in series, the series circuits being connected in parallel, the circuit includes: an acquisition portion which obtains a first index value and a second index value, the first index value being an index value corresponding to a resistance value of a first series circuit with a correlative relationship, the first series circuit having a lowest resistance value among the series circuits, the second index value being an index value corresponding to a resistance value of a second series circuit with a correlative relationship, the second series circuit having a highest resistance value among the series circuits; and a charging controller which controls the single charger to perform normal charging, in which the assembled battery is charged with a first amount of charge corresponding to the first index value, and to perform refresh charging, in which the assembled battery is charged with a second amount of charge corresponding to the second index value, in succession to the normal charging.

A power supply system according to an aspect of the present invention includes: an assembled battery which includes series circuits, each of the series circuits including one or more lead storage batteries connected in series, the series circuits being connected in parallel; a single charger which charges the assembled battery; and the above-described charging control circuit which controls the single charger.

According to the present invention, using the single charger, overcharging of the lead storage batteries included in the first series circuit, which has the lowest resistance value, may be suppressed by the normal charging, and sulfation of the lead storage batteries included in the second series circuit, which has the highest resistance value, may be eliminated favorably by the refresh charging.

BRIEF DESCRIPTION OF THE DRAWINGS

FIG. 3 is a view showing a table for determining a force-in charging time.

FIG. 4 is a view showing a table for determining a refresh charging time.

FIG. 11 is a view showing a table for determining the force-in charging time.

FIG. 12 is a view showing a table for determining the refresh charging time.

DESCRIPTION OF EMBODIMENTS

Findings of Inventors

Figure 1:
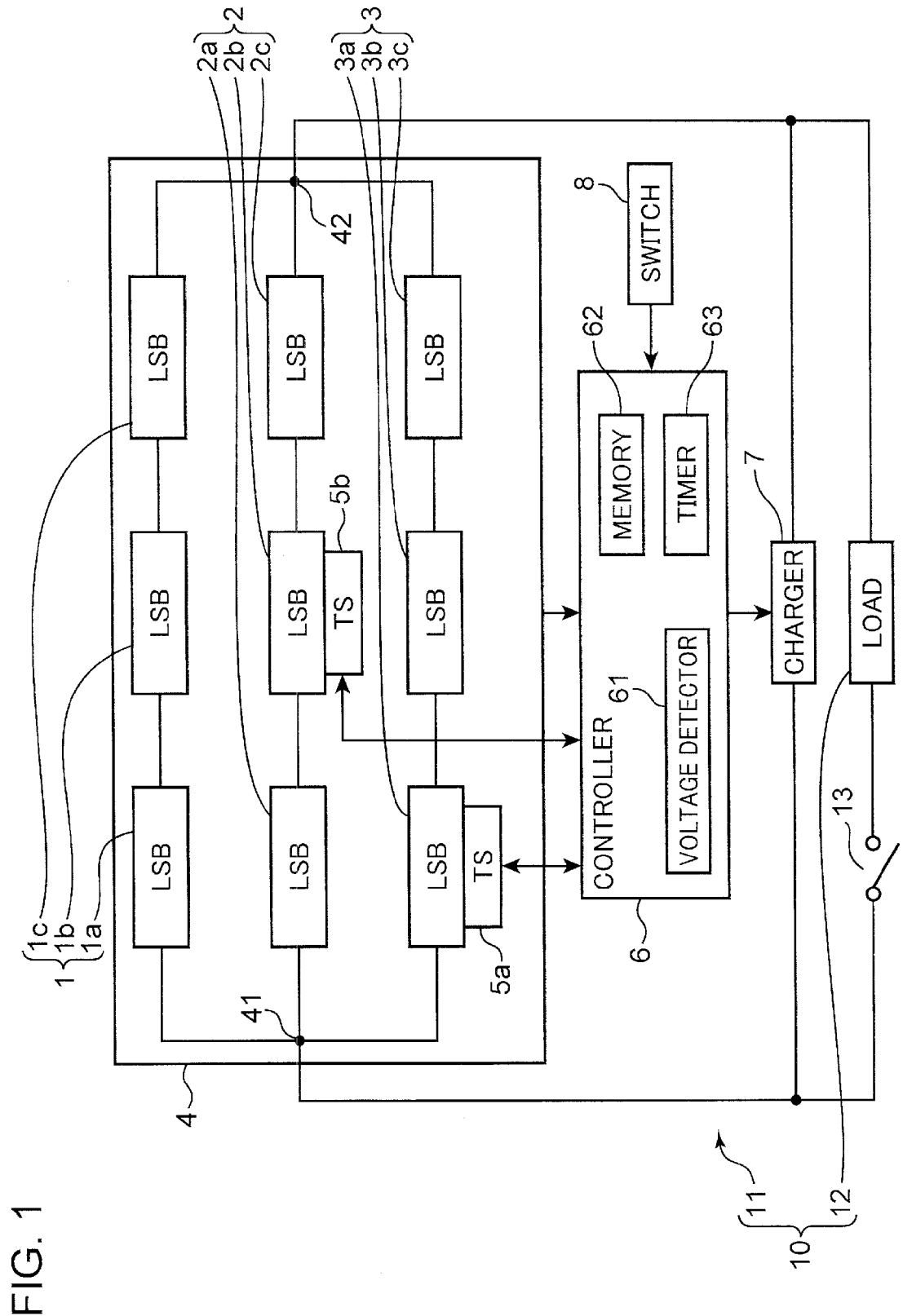
FIG. 1 is a block diagram schematically showing an example of a configuration of a battery-equipped device including a first embodiment of a power supply system.

First, the findings of the inventors will be described. The inventors conducted a comparative investigation into a difference between an adverse effect caused by overcharging (a reduction in life due to grid corrosion in a positive electrode) and an adverse effect caused by undercharging (a reduction in capacity due to sulfation). The inventors surmised as a result that a chemical change (corrosion) brought about by overcharging is irreversible, whereas a chemical change (sulfation) brought about by undercharging may be eliminated reversibly by implementing refresh charging described in WO 2010/137334, for example.

Hence, the inventors investigated a condition under which, even when an assembled battery formed by connecting in parallel plural single lead storage batteries (or plural series circuits respectively including plural lead storage batteries connected in series) is charged using a single charger, none of the series circuits are severely overcharged. As a result, an amount of charge during normal charging was associated with a resistance value of a series circuit having a lowest resistance value. In so doing, the series circuit having the lowest resistance value was prevented from being overcharged.

Here, normal charging is charging performed invariably when a user switches the charger on, for example. Further, associating the amount of charge with the resistance value of the series circuit having the lowest resistance value specifically means increasing the amount of charge as the resistance value of the series circuit having the lowest resistance value increases. Furthermore, the series circuit having the lowest resistance value is a series circuit that exhibits a high charging efficiency and is therefore likely to be overcharged.

It was found, however, that when normal charging is performed repeatedly under this condition, sulfation occurs gradually more severely in the lead storage batteries of a series circuit having a highest resistance value. Here, the series circuit having the highest resistance value is a series circuit that exhibits a low charging efficiency and is therefore likely to be undercharged.

Hence, the refresh charging described in WO 2010/137334, or in other words, charging for changing inactive lead sulfate into a charging product by applying an amount of electricity that exceeds the amount of charge during the normal charging, was performed once per several normal charging operations. Further, the amount of charge during the refresh charging was associated with the resistance value of the series circuit having the highest resistance value in order to eliminate sulfation in the lead storage batteries of the series circuit having the highest resistance value. Here, associating the amount of charge during the refresh charging with the resistance value of the series circuit having the highest resistance value specifically means increasing the amount of charge during the refresh charging as the resistance value of the series circuit having the highest resistance value increases.

The important matters of the findings made by the inventors in relation to this configuration are as follows. When normal charging is performed repeatedly, sulfation becomes more severe in the lead storage batteries of the series circuit having the highest resistance value. To eliminate sulfation in the lead storage batteries of this series circuit, a considerable amount of electricity has to be charged during the refresh charging. Hence, the series circuit having the lowest resistance value may be overcharged during the refresh charging, leading to progressed grid corrosion in the positive electrodes of the lead storage batteries. However, as long as a charging current value applied during the refresh charging is sufficiently small, grid corrosion in the positive electrode does not actually progress to a great extent.

Here, a sufficiently small charging current value is a value no larger than a charging current value used during an Nth stage of N-stage constant current charging (to be described below), for example, or more specifically no larger than 0.025 C, for example. Note that "C" will be used hereafter to express a current value in units of "1 C". 1 C is a current value at which an SOC of a battery reaches 0% (a stored electricity amount of zero) in one hour when the battery is discharged at a current value of 1 C (in other words, when a nominal capacity value of the battery is discharged at a current value of 1 C) from an SOC of 100% to an SOC of 0%. Note that "C" is also known as "It".

The reason why grid corrosion does not progress is still under investigation, but may be surmised as follows. Since the charging current value is sufficiently small, the charging efficiency is high, and therefore a secondary reaction is unlikely to occur. Moreover, when the lead storage battery is a control valve type battery and the charging current value during the refresh charging is sufficiently small, a reaction in which oxygen gas generated continuously but moderately by the positive electrode and hydrogen gas generated by the negative electrode recombine (in other words, a reduction reaction into water) occurs comparatively actively in a series circuit having a low resistance value. Accordingly, the oxygen gas is not retained in the vicinity of the positive electrode, and therefore the oxygen gas has little opportunity to contact the positive electrode to cause grid corrosion. It is assumed that this is the reason why grid corrosion does not progress.

As described above, the inventors have discovered that by increasing and reducing the amounts of electricity charged respectively during the normal charging and the refresh charging in accordance with the resistance values of the series circuits, sulfation may be eliminated favorably while suppressing overcharging. Factors leading to variation in the resistance value of the series circuit include specific internal resistance values of the individual lead storage batteries (a specific resistance of a grid, connection resistance between an electrode plate lug and a connection component, connection resistance between connection components, connection resistance between an electrode pole and a terminal, and so on), connection resistance between the lead storage batteries, resistance relating to a conductor wire connection between the series circuit and the charger, and so on. However, the factor that has the greatest effect on the resistance value of the series circuit is reaction resistance, which increases and decreases in response to a temperature to which the lead storage battery is exposed. Therefore, instead of detecting the resistance value of the series circuit, a surface temperature of the lead storage battery may be used.

Embodiments of the present invention will be described below using the drawings. Note that the following embodiments are specific examples of the present invention, and are not intended to limit the technical scope of the present invention.

First Embodiment

Figure 2:
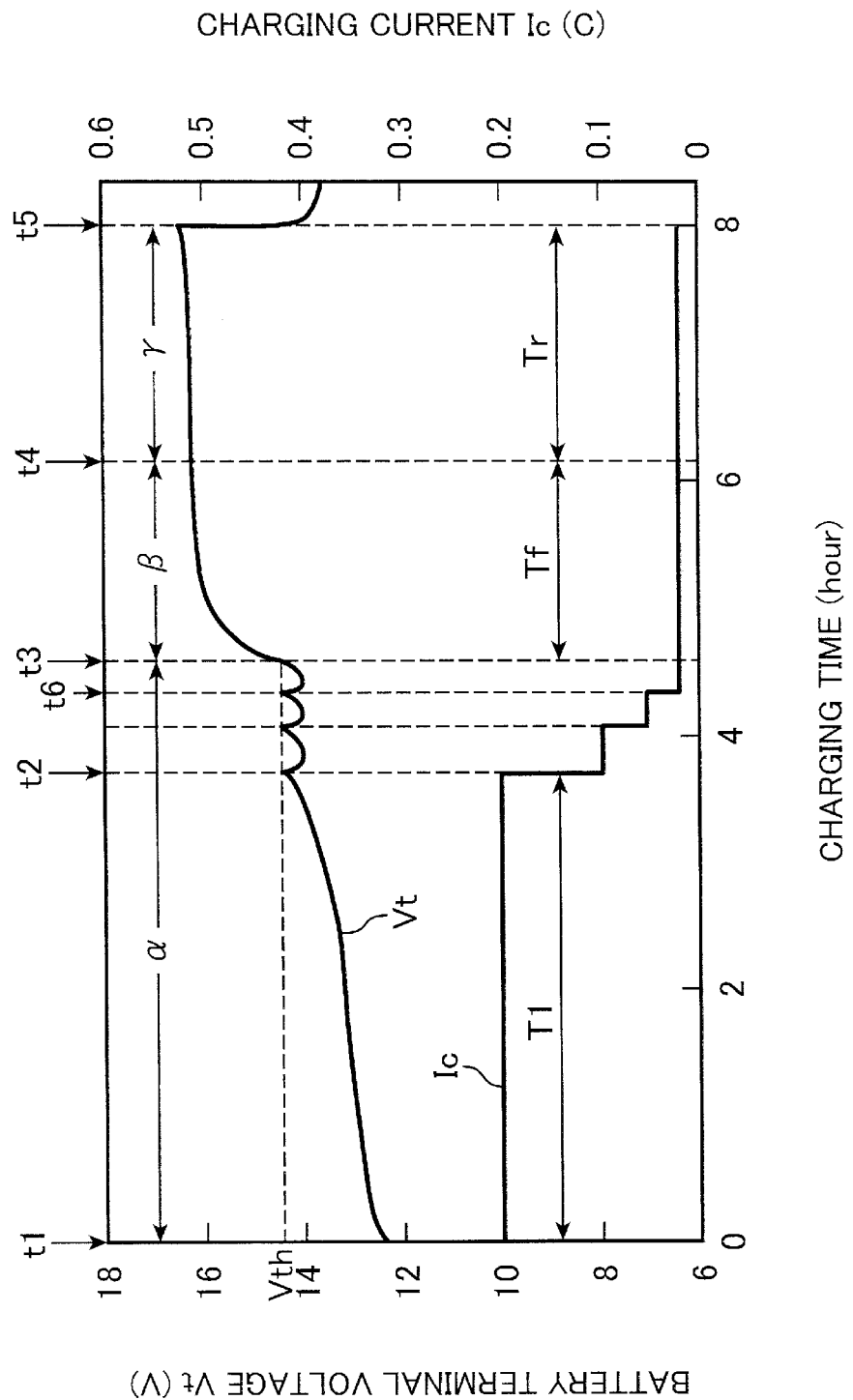
FIG. 2 is a view schematically showing an example of transitions of a terminal voltage Vt and a charging current Ic during charging of an assembled battery.

FIG. 1 is a block diagram schematically showing an example of a configuration of a battery-equipped device including a first embodiment of a power supply system. FIG. 2 is a view schematically showing an example of transitions of a terminal voltage Vt and a charging current Ic during charging of an assembled battery. FIG. 3 is a view showing a table for determining a force-in charging time Tf. FIG. 4 is a view showing a table for determining a refresh charging time Tr. To simplify the illustration, the terminal voltage Vt of a single lead storage battery is shown in FIG. 2.

A battery-equipped device 10 shown in FIG. 1 includes a power supply system 11 and a load 12. In this embodiment, the battery-equipped device 10 is a specialized electric vehicle, for example. When a switch 13 is switched on, power is supplied from the power supply system 11 to the load 12, which is constituted by a motor, for example. The power supply system 11 includes an assembled battery 4, temperature sensors 5a, 5b, a controller 6, a charger 7, and a switch 8.

The assembled battery 4 includes series circuits 1, 2, and 3 connected in parallel. The series circuit 1 includes lead storage batteries (LSBs) 1a, 1b, and 1c connected in series. Similarly, the series circuit 2 includes lead storage batteries (LSBs) 2a, 2b, and 2c connected in series, and the series circuit 3 includes lead storage batteries (LSBs) 3a, 3b, and 3c connected in series. As shown schematically in FIG. 1, the series circuit 2 is disposed so as to be physically sandwiched between the series circuit 1 and the series circuit 3. Further, as shown in FIG. 1, the lead storage batteries 1a to 3c are physically disposed in a lattice shape, for example. In this embodiment, the lead storage batteries 1a to 3c respectively have a nominal voltage of 12 [V] and a nominal capacity of 60 [Ah], for example.

The charger 7 is controlled by the controller 6 to charge the assembled battery 4. More specifically, in this embodiment, the respective lead storage batteries of the series circuits 1, 2, and 3 connected to each other in parallel to form the assembled battery 4 are charged using the single charger 7. Once charging is complete, the assembled battery 4 may be discharged to the load 12 by switching the switch 13 on.

When the assembled battery 4 is configured such that the series circuit 2 is sandwiched between the series circuits 1 and 3, as shown schematically in FIG. 1, the series circuits 1 and 3 have a smaller number of adjacent batteries. Therefore, respective resistance values thereof increase upon exposure to a low temperature. In the series circuits 1 and 3, the lead storage batteries 1a, 1c, 3a, and 3c are disposed on the edges. Therefore, the respective resistance values of these batteries increase particularly upon exposure to a low temperature. Conversely, the series circuit 2 has a large number of adjacent batteries. Therefore, the resistance value thereof decreases upon exposure to a high temperature. In the series circuit 2, the lead storage battery 2b is disposed in the center. Therefore, the resistance value of this battery decreases particularly upon exposure to a high temperature.

In this embodiment, as shown in FIG. 1, the temperature sensor (TS) 5a is provided on the lead storage battery 3a that is exposed to the lowest temperature (i.e. that has the largest resistance value). And, the temperature sensor (TS) 5b is provided on the lead storage battery 2b that is exposed to the highest temperature (i.e. that has the smallest resistance value). The temperature sensors 5a, 5b measure the respective surface temperatures of the lead storage batteries 3a, 2b. The temperature sensors 5a, 5b then output the measured surface temperatures to the controller 6.

The controller 6 includes a voltage detector 61, a memory 62, and a timer 63. The voltage detector 61 detects a voltage between terminals 41, 42 of the assembled battery 4 as the terminal voltage Vt. The memory 62 stores the tables shown in FIGS. 3 and 4. The memory 62 also stores a charging time T1 of a first stage (to be described below). The timer 63 counts the charging time. As shown in FIG. 2, when the switch 8 is switched on, the controller 6 controls the charger 7 such that normal charging employing N-stage constant current charging is started. The controller 6 controls the charger 7 such that every time the normal charging is performed a preset number of times K (where K is an integer of 1 or more), refresh charging is executed in succession to the normal charging.

The N-stage constant current charging is performed as shown in FIG. 2. Constant current charging of a first stage is started with a predetermined charging current value. Constant current charging of respective stages of the first stage to an (N−1)th stage (where N is an integer of not less than 2) in the N-stage constant current charging are performed in turn, with a charging current value being reduced when a stage is advanced to a next stage, the stage being advanced to the next stage when the terminal voltage Vt of the assembled battery 4 reaches a predetermined end-of-charge voltage Vth. Constant current charging of an Nth stage is performed for a predetermined time Tf with a current value lower than or substantially identical to the charging current value in the (N−1)th stage, the (N−1)th stage being advanced to the Nth stage when the terminal voltage Vt of the assembled battery 4 reaches the end-of-charge voltage Vth in the (N−1)th stage. FIG. 2 shows an example in which N=5.

Note that the constant current charging of the Nth stage may be performed with a smaller current value than the charging current value in the (N−1)th stage. Further, FIG. 2 shows the terminal voltage Vt of a single lead storage battery for ease of illustration, and therefore Vth=14.4. In the first embodiment, however, each of the series circuits 1 to 3 includes three lead storage batteries connected in series. Therefore, in actuality, Vth=14.4×3=43.2.

In a region α in FIG. 2, the constant current charging is advanced to the next stage when the assembled battery 4 reaches the end-of-charge voltage Vth, with the charging current value being reduced. In a region β, the constant current charging of the Nth stage (in FIG. 2, N=5) is performed for the predetermined time Tf after the assembled battery 4 reaches the end-of-charge voltage Vth. So-called "force-in charging" is performed in the region β. Hence, a region constituted by the regions α and β corresponds to the N-stage (N=5) constant current charging.

FIG. 2 shows an example in which a current value Ic1 serving as a set current value Is of the first stage is 0.2 C, a current value Ic2 serving as a set current value Is of the second stage is 0.1 C, a current value Ic3 serving as a set current value Is of the third stage is 0.05 C, current values Ic4, Ic5 serving as set current values Is of the fourth and fifth stages are respectively 0.025 C, and the end-of-charge voltage Vth is 14.4 V. Note that 14.4 V is an example of the end-of-charge voltage Vth suitable when a temperature Tp of the lead storage battery is 25° C. Hence, the end-of-charge voltage Vth is not limited to 14.4 V, and may be set as appropriate. In this embodiment, therefore, a charging current IcN is set at Ic1>Ic2>Ic3>Ic4=Ic5. The N-stage constant current charging performed in the regions α and β corresponds to an example of the normal charging performed in the third step.

The memory 62 of the controller 6 stores a table such as that shown in FIG. 3, for example. FIG. 3 shows a table associating the predetermined time Tf for which to perform the force-in charging with the charging time T1 of the first stage and a battery temperature Tp1 measured by the temperature sensor 5b. When the surface temperature of the lead storage battery 2b measured by the temperature sensor 5b is output to the controller 6, the controller 6 determines the predetermined time Tf for which to perform the force-in charging in the region β by comparing the measured battery temperature Tp1 and the charging time T1 of the first stage, to be described below, with the table of FIG. 3. The controller 6 then controls the charger 7 on the basis of the determined predetermined time Tf. By employing this configuration, the lead storage battery 2b (i.e. a lead storage battery of the series circuit 2) exposed to the highest temperature (i.e. having the lowest resistance value and therefore the highest charge acceptance) is not overcharged during the charging (the normal charging) performed in the regions α and β.

Note that an amount of charge (the charging time T1) of the first stage of the N-stage constant current charging becomes larger (longer) as a state of charge (SOC) immediately before a start time t1 of the charging is smaller. Hence, the amount of charge of the first stage affects the predetermined time Tf for which to perform the force-in charging in the region β. As shown in FIG. 3, therefore, the predetermined time Tf for which to perform the force-in charging in the region β is set to be longer as the amount of charge during the first stage becomes larger (i.e. as the charging time T1 is longer).

In a region γ in FIG. 2, the refresh charging is performed for the predetermined time Tr immediately after the end of the charging (the normal charging) in the regions α and β. The memory 62 of the controller 6 stores a table such as that shown in FIG. 4, for example. When the surface temperature of the lead storage battery 3a measured by the temperature sensor 5a is output to the controller 6, the controller 6 determines the predetermined time Tr for which to perform the refresh charging in the region γ by comparing a measured battery temperature Tp2 and the charging time T1 of the first stage, to be described below, with the table of FIG. 4. The controller 6 then controls the charger 7 on the basis of the determined predetermined time Tr. By employing this configuration, sulfation in the lead storage battery 3a (i.e. a lead storage battery of the series circuit 3) exposed to the lowest temperature (i.e. having the highest resistance value and therefore the lowest charge acceptance) may be eliminated sufficiently by the refresh charging. The charging performed in the region γ corresponds to an example of the refresh charging performed in the fourth step.

Note that in FIGS. 3 and 4, the charging times Tf, Tr are set, but the embodiment is not limited thereto, and instead, amounts of charge Qf, Qr may be set. In this embodiment, both the force-in charging and the refresh charging are constituted by constant current charging performed at the current value Ic5. Therefore, Qf=Tf×Ic5, Qr=Tr×Ic5. In this embodiment, the amount of charge during the charging performed in the regions α and β of FIG. 2 corresponds to an example of the first amount of charge, and the amount of charge during the charging performed in the region γ of FIG. 2 corresponds to an example of the second amount of charge. Further, the battery temperature Tp1 measured by the temperature sensor 5b (the battery temperature Tp1 used in FIG. 3) corresponds to an example of the first index value, and the battery temperature Tp2 measured by the temperature sensor 5a (the battery temperature Tp2 used in FIG. 4) corresponds to an example of the second index value. Furthermore, the controller 6 corresponds to an example of the acquisition portion and the charging controller.

Figure 5:
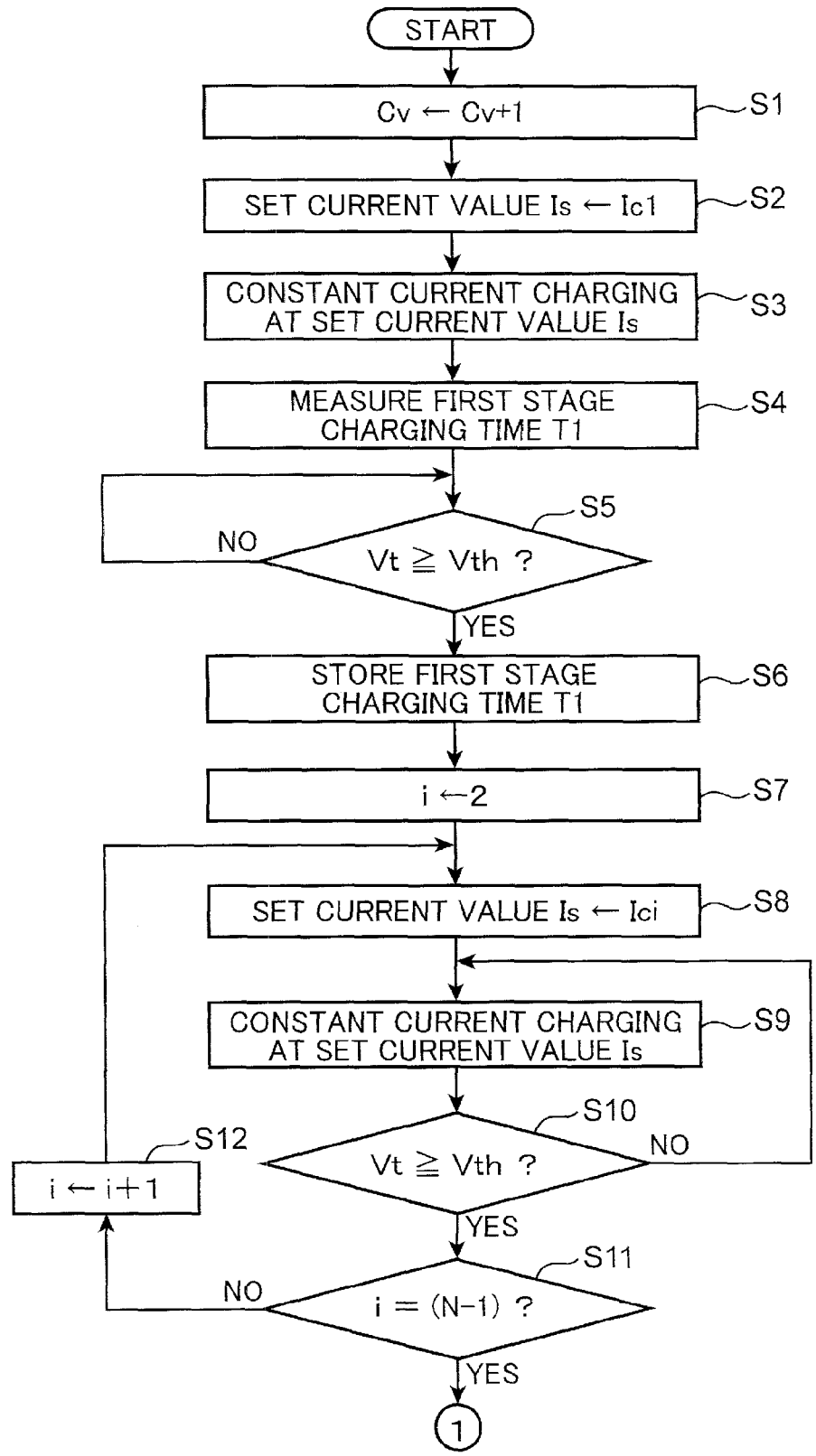
FIG. 5 is a flowchart showing an example of an assembled battery charging operation using the power supply system according to the first embodiment.
Figure 6:
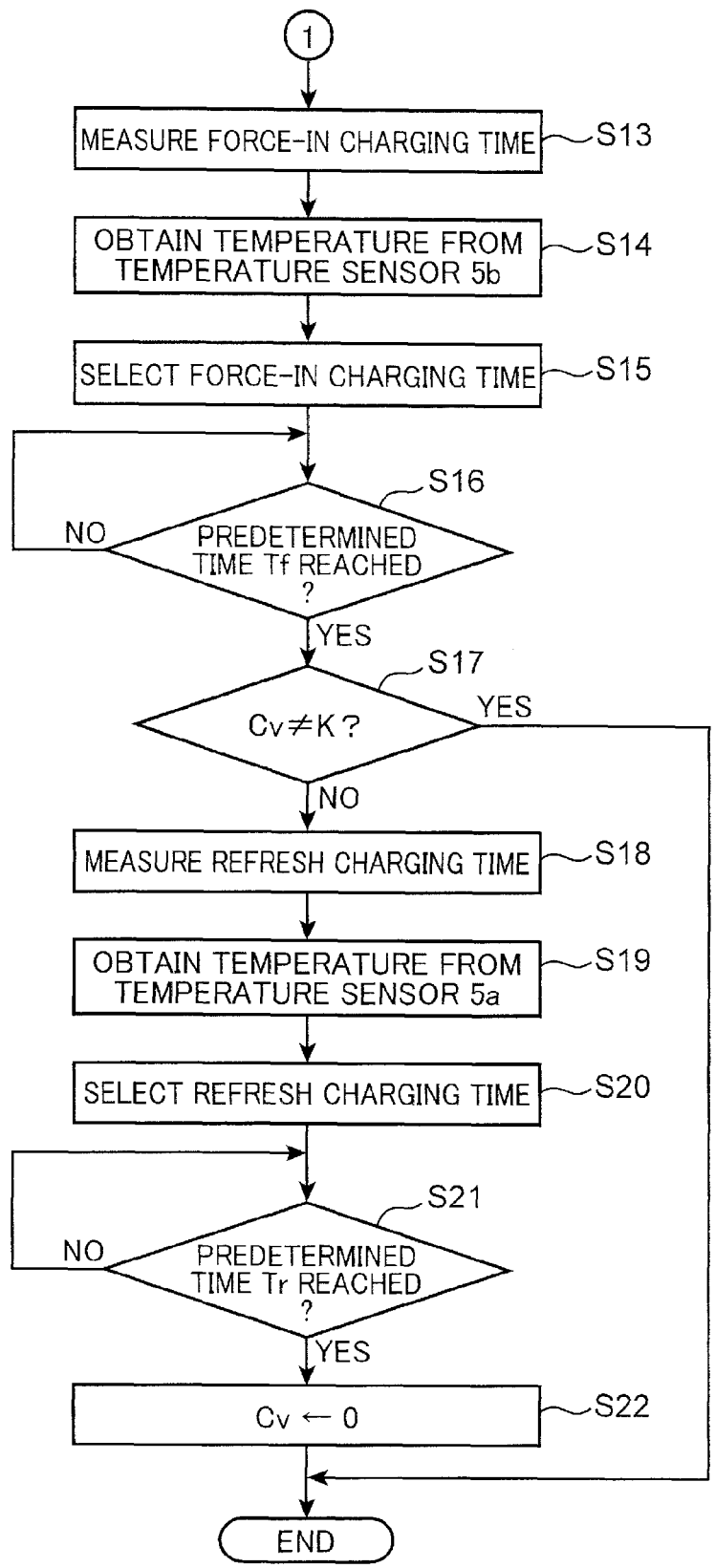
FIG. 6 is a flowchart showing an example of the assembled battery charging operation using the power supply system according to the first embodiment.

FIGS. 5 and 6 are flowcharts showing an example of an assembled battery charging operation using the power supply system according to the first embodiment. A charging operation performed on the assembled battery according to the first embodiment will be described below using FIGS. 1 to 6.

When the switch 8 is switched on, the operation of FIG. 5 starts. First, to determine whether or not to execute the refresh charging, a count value Cv used to count a number of executions of the normal charging (the N-stage constant current charging, i.e. the charging performed in the regions α and β of FIG. 2) is increased by 1 (step S1). Next, the current value Ic1 is set by the controller 6 as the set current value Is (step S2). A charging current having the set current value Is is then supplied to the assembled battery 4 by the charger 7 in response to a control signal from the controller 6, whereby the assembled battery 4 is subjected to constant current charging (step S3, the time t1 in FIG. 2). Next, the timer 63 starts to measure the charging time T1 of the first stage (step S4).

As shown in FIG. 2, during the constant current charging of step S3, constant current charging is executed at the current value Ic1 of 0.2 C. And, the terminal voltage Vt of the assembled battery 4 gradually increases. Here, the charging current is distributed among the series circuits 1 to 3. Accordingly, a charging current having a current value of (Ic1×3) is supplied from the charger 7 to the assembled battery 4 so that the current values flowing through the respective series circuits 1 to 3 reach Ic1.

As described above, the series circuits 1 to 3 have different resistance values due to temperature differences therein. The charging currents supplied respectively to the series circuits 1 to 3 from the charger 7 do not therefore reach the same current value Ic1. As a result, both a series circuit whose amount of charge is small due to a low temperature (i.e. a high resistance value) and a series circuit whose amount of charge is large due to a high temperature (i.e. a low resistance value) exist.

In this embodiment, however, the amount of charge during the normal charging is determined in alignment with the series circuit having the high temperature (i.e. the amount of charge is large). Therefore, overcharging may be prevented. Further, the amount of charge during the refresh charging is determined in alignment with the series circuit having the low temperature (i.e. the amount of charge is small). Therefore, sulfation may be eliminated while simultaneously preventing undercharging.

Returning to FIG. 5, the controller 6 compares the terminal voltage Vt with the end-of-charge voltage Vth (step S5). When the terminal voltage Vt does not yet reach or exceed the end-of-charge voltage Vth (NO in step S5), the charging operation is continued. When the terminal voltage Vt reaches or exceeds the end-of-charge voltage Vth (YES in step S5, a time t2 in FIG. 2), the charging time T1 of the first stage is stored in the memory 62 (step S6). Then, 2 is assigned to a variable i in order to start the constant current charging of the second stage (step S7).

Next, a current value Ici (Ic2=0.1 C, Ic3=0.05 C, Ic4=0.025 C) is set by the controller 6 as the set current value Is (step S8). Here, the current value Ici signifies Ic2 when i=2, Ic3 when i=3, and Ic4 when i=4. A charging current having the set current value Is is then supplied to the assembled battery 4 by the charger 7 in response to a control signal from the controller 6, whereby the assembled battery 4 is subjected to constant current charging (step S9).

Next, the controller 6 compares the terminal voltage Vt with the end-of-charge voltage Vth (step S10). When the terminal voltage Vt does not yet reach or exceed the end-of-charge voltage Vth (NO in step S10), the controller 6 repeats steps S9 and S10. When the terminal voltage Vt reaches or exceeds the end-of-charge voltage Vth (YES in step S10), the variable i is compared with (N−1) to determine whether or not charging has been completed up to the (N−1)th stage (step S11; in this embodiment, N−1=4).

When the variable i is not equal to (N−1) (NO in step S11), 1 is added to the variable i in order to execute the constant current charging of the next stage (step S12). Then, steps S8 to S11 are repeated again. When the variable i is equal to (N−1) (YES in step S11, a time t3 in FIG. 2), on the other hand, the operation advances to step S13. The constant current charging performed in steps S2 to S11 described above corresponds to the region α in FIG. 2.

In step S13, the controller 6 starts to measure the force-in charging time. Here, the constant current charging is continued in the form of the constant current charging of the Nth stage (the force-in charging) in succession to the constant current charging of the (N−1)th stage in step S9. Next, the controller 6 obtains the battery temperature Tp1 of the lead storage battery 2b, measured by the temperature sensor 5b (step S14, corresponding to an example of the first step).

Next, the controller 6 selects the predetermined time Tf of the force-in charging serving as the constant current charging of the Nth stage by comparing the obtained battery temperature Tp1 and the charging time T1 of the first stage, stored in the memory 62 in step S6, with the table of FIG. 3 stored in the memory 62 (step S15, corresponding to an example of the fifth step). Next, the controller 6 judges whether or not the measured force-in charging time has reached the predetermined time Tf selected in step S15 (step S16).

The controller 6 remains on standby until the force-in charging time reaches the predetermined time Tf (NO in step S16). When the force-in charging time reaches the predetermined time Tf (YES in step S16), the controller 6 judges whether or not the count value Cv differs from the set number K (in this embodiment, K=5, for example) (step S17). When the count value Cv differs from the set number K (YES in step S17), the charging is terminated without performing the refresh charging.

When the count value Cv is equal to the set number K (NO in step S17), on the other hand, the controller 6 starts to measure the refresh charging time (step S18). Here, the constant current charging of the Nth stage (the force-in charging), which has been performed in succession to the constant current charging of the (N−1)th stage in step S9, is continued in the form of the refresh charging. Next, the controller 6 obtains the battery temperature Tp2 of the lead storage battery 3a, measured by the temperature sensor 5a (step S19, corresponding to an example of the second step).

Next, the controller 6 selects the predetermined time Tr of the refresh charging by comparing the obtained battery temperature Tp2 and the charging time T1 of the first stage, stored in the memory 62 in step S6, with the table of FIG. 4 stored in the memory 62 (step S20, corresponding to an example of the sixth step). Next, the controller 6 judges whether or not the measured refresh charging time has reached the predetermined time Tr selected in step S20 (step S21).

The controller 6 remains on standby until the refresh charging time reaches the predetermined time Tr (NO in step S21). When the refresh charging time reaches the predetermined time Tr (YES in step S21), the controller 6 resets the count value Cv to 0 (step S22) and then terminates the charging. As a result of this operation, the refresh charging is performed every time the normal charging is performed K times (in this embodiment, K=5, for example).

In the first embodiment, as described above, the predetermined time Tf serving as the force-in charging time of the normal charging is determined on the basis of the battery temperature Tp1 of the lead storage battery 2b, which is measured by the temperature sensor 5b. Therefore, the lead storage battery having the lowest resistance value may be prevented from being overcharged. Further, in the first embodiment, the predetermined time Tr serving as the refresh charging time is determined on the basis of the battery temperature Tp2 of the lead storage battery 3a, which is measured by the temperature sensor 5a. Therefore, sulfation in the lead storage battery having the highest resistance value may be eliminated sufficiently.

According to the first embodiment, therefore, the assembled battery 4, formed by connecting in parallel the series circuits 1 to 3 in which lead storage batteries are connected in series, may be charged favorably using the single charger 7 such that sulfation is eliminated sufficiently while avoiding overcharging.

Second Embodiment

Figure 7:
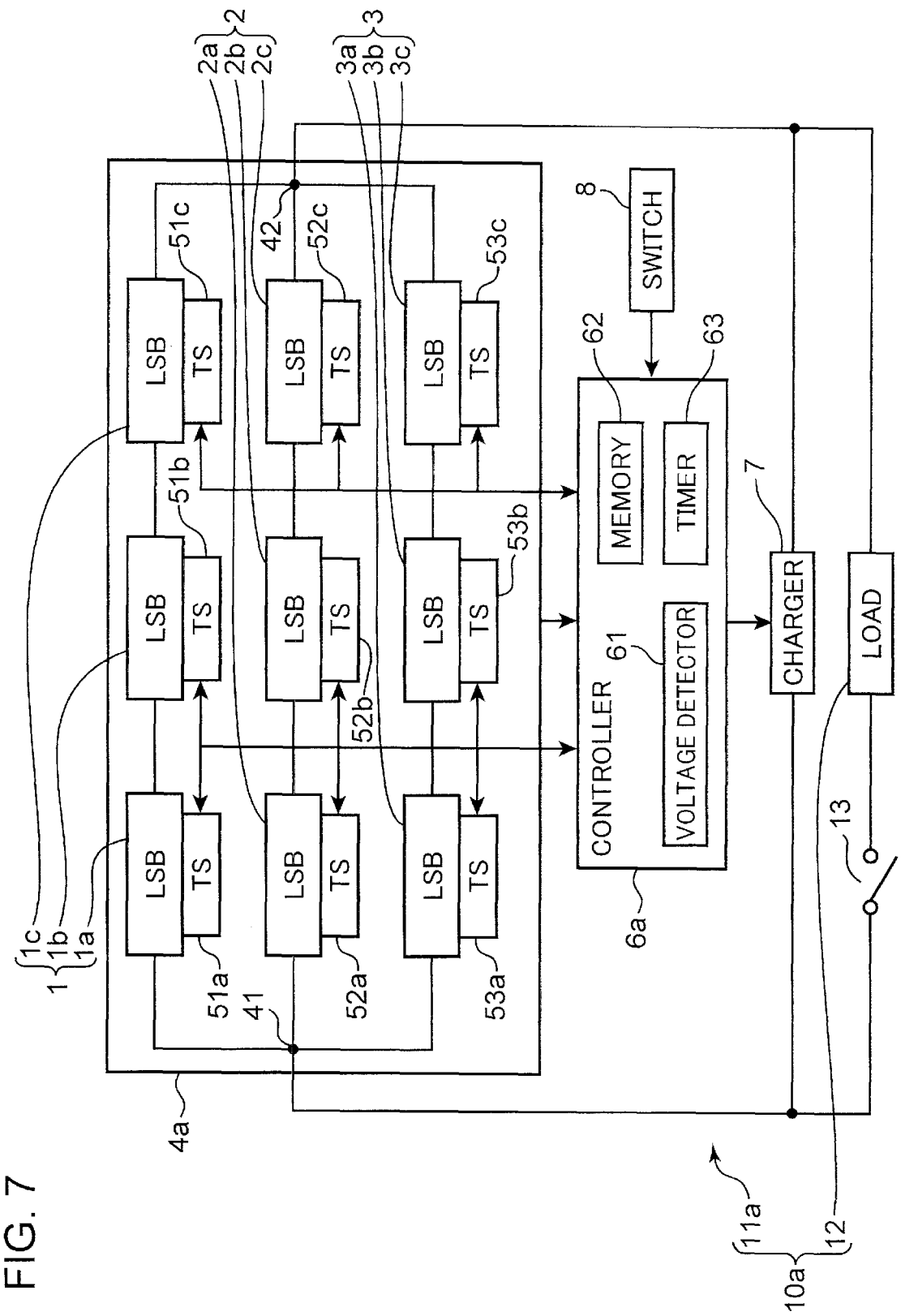
FIG. 7 is a block diagram schematically showing an example of a configuration of a battery-equipped device including a second embodiment of a power supply system.

FIG. 7 is a block diagram schematically showing an example of a configuration of a battery-equipped device including a second embodiment of a power supply system. In FIG. 7, identical elements to the first embodiment have been allocated identical reference symbols. The second embodiment will be described below while focusing on differences with the first embodiment.

A battery-equipped device 10a according to the second embodiment includes a power supply system 11a in place of the power supply system 11 provided in the battery-equipped device 10 of the first embodiment. The power supply system 11a of the second embodiment differs from the power supply system 11 of the first embodiment in including an assembled battery 4a in place of the assembled battery 4 and a controller 6a in place of the controller 6. Further, in the assembled battery 4a of the second embodiment, as shown schematically in FIG. 7, each lead storage battery (LSB) is provided with a temperature sensor (TS) that measures the surface temperature thereof.

More specifically, temperature sensors 51a, 51b, 51c are provided respectively for the lead storage batteries 1a, 1b, 1c of the series circuit 1. Further, temperature sensors 52a, 52b, 52c are provided respectively for the lead storage batteries 2a, 2b, 2c of the series circuit 2. Furthermore, temperature sensors 53a, 53b, 53c are provided respectively for the lead storage batteries 3a, 3b, 3c of the series circuit 3. The temperature sensors 51a, 51b, 51c, 52a, 52b, 52c, 53a, 53b, 53c output the battery temperatures Tp measured respectively thereby to the controller 6a.

The controller 6a controls the charger 7 to perform N-stage constant current charging (in the second embodiment, N=2). The controller 6a obtains the battery temperatures Tp serving as the surface temperatures of the lead storage batteries output from the temperature sensors 51a, 51b, 51c, 52a, 52b, 52c, 53a, 53b, 53c. The controller 6a then selects a highest temperature value of the obtained battery temperatures Tp as the battery temperature Tp1, and sets the end-of-charge voltage Vth from the battery temperature Tp1 using a following equation.

$$Vth=14.4-0.03(Tp1-25) \quad (1)$$

As described above in the first embodiment, the series circuits 1 to 3 respectively include three lead storage batteries connected in series, and therefore in actuality the end-of-charge voltage Vth is three times the value set using the above equation.

The controller 6a selects the highest temperature value of the obtained battery temperatures Tp as the battery temperature Tp1 (corresponding to an example of the first index value), and determines the charging time Tf of the force-in charging from the battery temperature Tp1 using the table shown in FIG. 3. Further, the controller 6a selects a lowest temperature value of the obtained battery temperatures Tp as the battery temperature Tp2 (corresponding to an example of the second index value), and determines the charging time Tr of the refresh charging from the battery temperature Tp2 using the table shown in FIG. 4.

Figure 8:
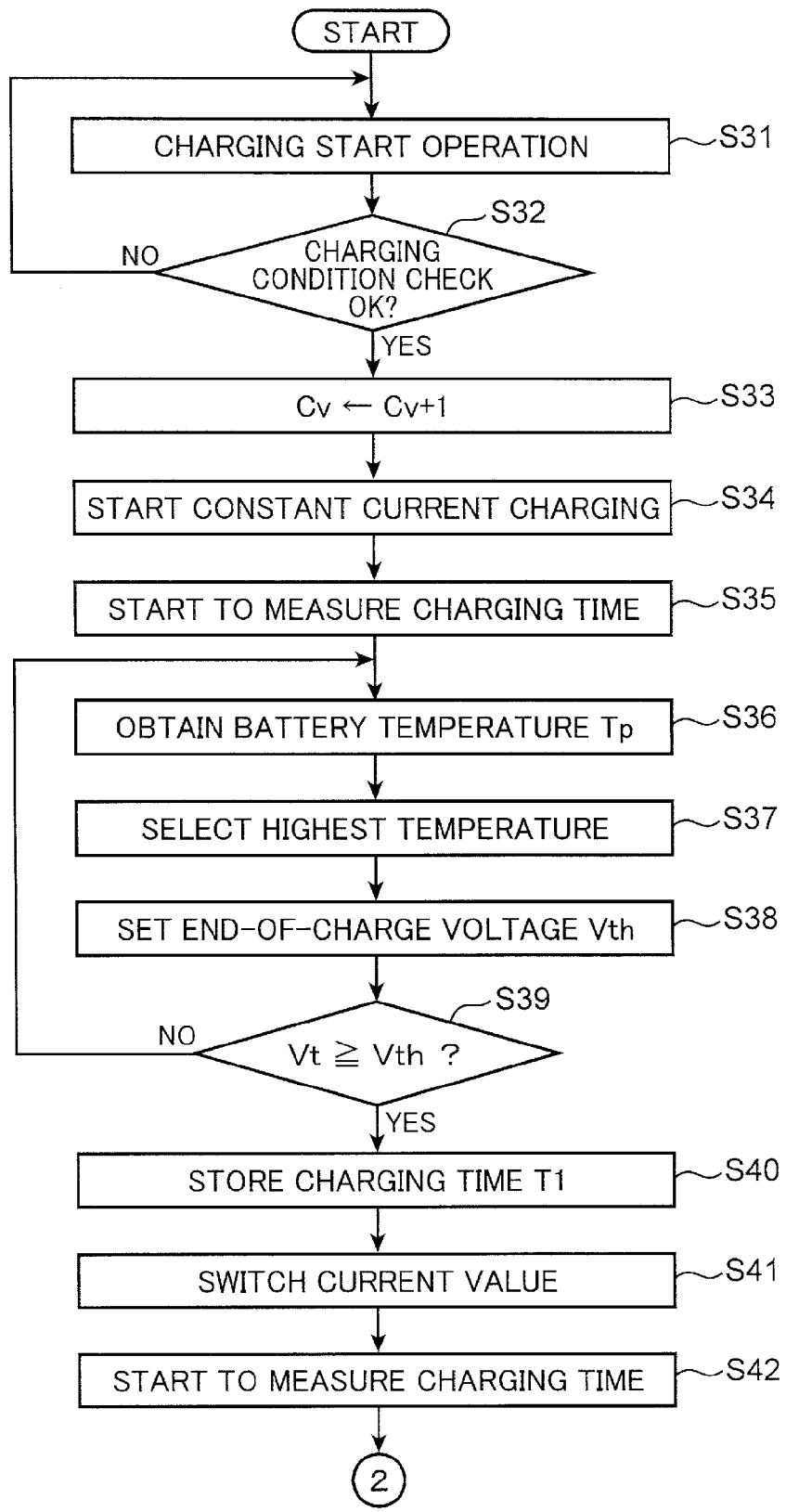
FIG. 8 is a flowchart showing an example of an assembled battery charging operation using the power supply system according to the second embodiment.
Figure 9:
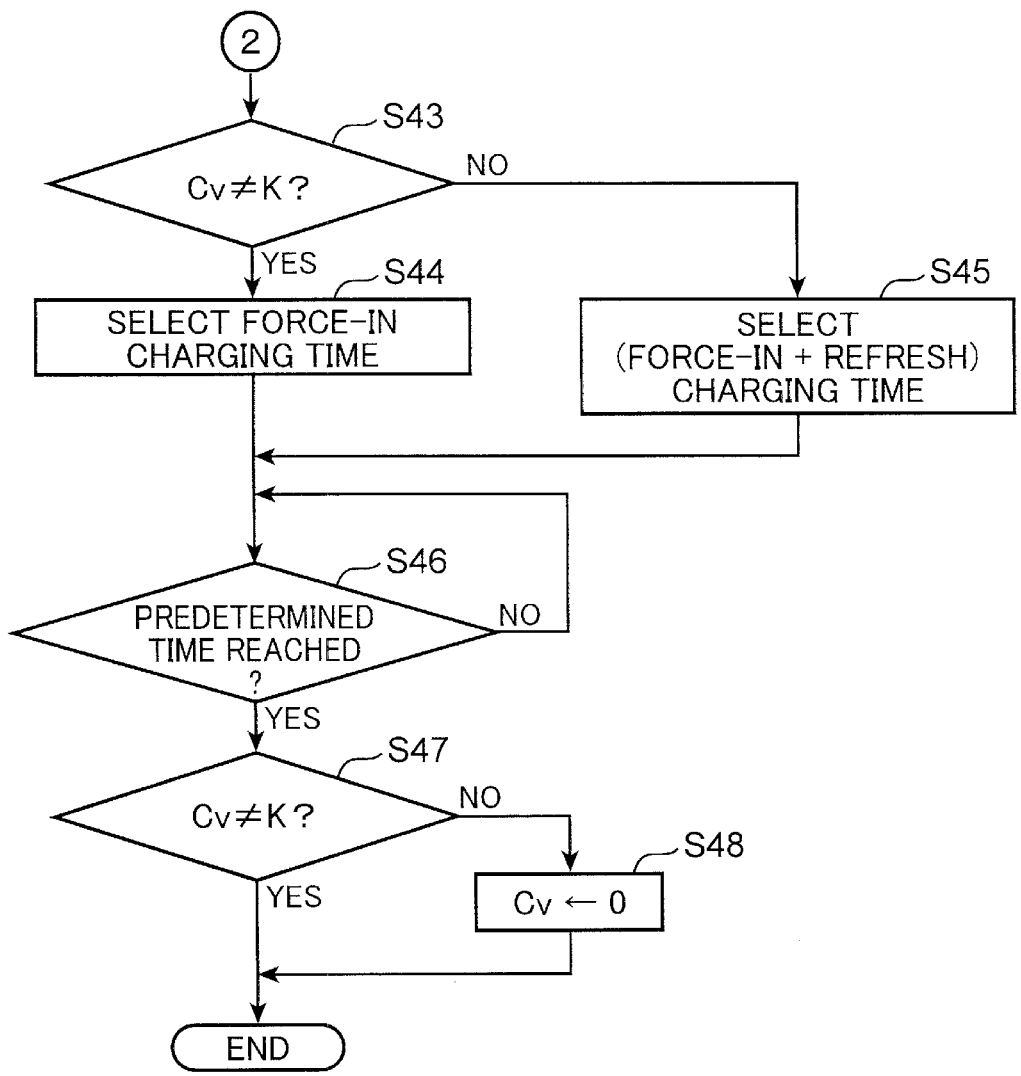
FIG. 9 is a flowchart showing an example of the assembled battery charging operation using the power supply system according to the second embodiment.

FIGS. 8 and 9 are flowcharts showing an example of an assembled battery charging operation using the power supply system according to the second embodiment. A charging operation performed on the assembled battery according to the second embodiment will be described below using FIGS. 3, 4, and 7 to 9.

When the switch 8 is switched on to perform a charging start operation (step S31), first, the controller 6a checks a charging condition to judge whether or not the charging condition is satisfied (step S32). Here, the controller 6a judges that the charging condition is satisfied when, for example, the terminal voltage of the assembled battery 4 is smaller than (12.8×3) V and a maximum value of the battery temperature is lower than 55° C. (YES in step S32), and then the operation advances to step S33. In step S33, the count value Cv is increased by 1.

When, on the other hand, the terminal voltage of the assembled battery 4 equals or exceeds (12.8×3) V or the maximum value of the battery temperature equals or exceeds 55° C., for example, the controller 6a judges that the charging condition is not satisfied (NO in step S32), and returns to step S31 to wait until the switch 8 is next switched on. In other words, when the terminal voltage of the assembled battery 4 equals or exceeds (12.8×3) V, the controller 6a judges that the assembled battery 4 is in a fully charged condition. Therefore, to prevent deterioration caused by overcharging, charging is not performed. Further, when the maximum value of the battery temperature equals or exceeds 55° C., charging is not performed to ensure that abnormalities caused by an excessively high temperature do not occur.

Note that the voltage detector 61 may detect the terminal voltages of the respective lead storage batteries 1a to 1c, 2a to 2c, 3a to 3c individually. In this case, the controller 6a may refrain from performing charging when even one lead storage battery having a terminal voltage that equals or exceeds 12.8 V exists. Further, in this case, the controller 6a may use a total value of the respective terminal voltages of the lead storage batteries 1a to 1c, a total value of the respective terminal voltages of the lead storage batteries 2a to 2c, or a total value of the respective terminal voltages of the lead storage batteries 3a to 3c as the terminal voltage Vt.

Furthermore, the charging condition may be checked in any manner in step S32 as long as it is possible to judge whether or not the assembled battery 4 is in a suitable condition for charging. Hence, when checking the charging condition in step S32, the judge as to whether or not the assembled battery 4 is in a suitable condition for charging may be made using another method.

Next, the controller 6a sets the current value Ic1 (Ic1=0.2 C, for example) as the set current value Is, and then starts the constant current charging (step S34). Here, the charging current is distributed among the series circuits 1 to 3. Accordingly, a charging current having a current value of (Ic1×3) is supplied from the charger 7 to the assembled battery 4 so that the current values flowing through the respective series circuits 1 to 3 reach Ic1.

As described above, the series circuits 1 to 3 have different resistance values due to temperature differences therein. The charging currents supplied respectively to the series circuits 1 to 3 from the charger 7 do not therefore reach the same current value Ic1. As a result, both a series circuit whose amount of charge is small due to a low temperature (i.e. a high resistance value) and a series circuit whose amount of charge is large due to a high temperature (i.e. a low resistance value) exist.

In this embodiment, however, the amount of charge during the normal charging is determined in alignment with the series circuit having the high temperature (i.e. the large amount of charge). Therefore, overcharging may be prevented. Further, the amount of charge during the refresh charging is determined in alignment with the series circuit having the low temperature (i.e. the small amount of charge). Therefore, sulfation may be eliminated while simultaneously preventing undercharging.

Next, the timer 63 starts to measure the charging time T1 (step S35). Next, the controller 6a obtains the battery temperatures Tp output from the temperature sensors 51a, 51b, 51c, 52a, 52b, 52c, 53a, 53b, 53c (step S36). Then, the controller 6a selects the highest temperature value of the obtained battery temperatures Tp as the battery temperature Tp1 (step S37). And then, the controller 6a sets the end-of-charge voltage Vth using Equation (1) shown above (step S38).

Next, the controller 6a compares the terminal voltage Vt with the end-of-charge voltage Vth (step S39). When the terminal voltage Vt does not yet reach or exceed the end-of-charge voltage Vth (NO in step S39), the controller 6a repeats steps S36 to S39. When the terminal voltage Vt reaches or exceeds the end-of-charge voltage Vth (YES in step S39), the charging time T1 of the first stage is stored in the memory 62 (step S40).

Next, the controller 6a switches the set current value Is to the current value Ic2 (Ic2=0.025 C, for example). Then, the controller 6a starts the force-in charging (step S41). And then, the timer 63 starts to measure the charging time (step S42). Here, the constant current charging of the second stage (the force-in charging) is performed in succession to the constant current charging of the first stage in step S34. Hence, in the N-stage constant current charging (corresponding to an example of the normal charging performed in the third step) of the second embodiment, N=2.

Next, the controller 6a judges whether or not the count value Cv differs from the set number K (in this embodiment, K=5, for example) (step S43). When the count value Cv differs from the set number K (YES in step S43), the process advances to step S44 in order to perform only the normal force-in charging without performing the refresh charging. When the count value Cv is equal to the set number K (NO in step S43), on the other hand, the process advances to step S45 in order to perform the refresh charging in addition to the normal force-in charging.

In step S44, the controller 6a obtains the battery temperatures Tp output from the temperature sensors 51a, 51b, 51c, 52a, 52b, 52c, 53a, 53b, 53c, and selects the highest temperature value of the obtained battery temperatures Tp as the battery temperature Tp1. The controller 6a then selects the predetermined time Tf of the force-in charging by comparing the selected battery temperature Tp1 and the charging time T1 of the first stage, stored in the memory 62 in step S40, with the table of FIG. 3 stored in the memory 62. The process then advances to step S46. Step S44 corresponds to an example of the first step and the fifth step.

In step S45, the controller 6a obtains the battery temperatures Tp output from the temperature sensors 51a, 51b, 51c, 52a, 52b, 52c, 53a, 53b, 53c. The controller 6a selects the highest temperature value of the obtained battery temperatures Tp as the battery temperature Tp1. The controller 6a selects the lowest temperature value of the obtained battery temperatures Tp as the battery temperature Tp2. The controller 6a then selects the predetermined time Tf of the force-in charging by comparing the selected highest battery temperature Tp1 and the charging time T1 of the first stage, stored in the memory 62 in step S40, with the table of FIG. 3 stored in the memory 62. Furthermore, the controller 6a selects the predetermined time Tr of the refresh charging by comparing the selected lowest battery temperature Tp2 and the charging time T1 of the first stage, stored in the memory 62 in step S40, with the table of FIG. 4 stored in the memory 62. The controller 6a then calculates a predetermined time (Tf+Tr). Then, the process advances to step S46. Step S45 corresponds to an example of the first, second, fifth, and sixth steps. The refresh charging corresponds to an example of the refresh charging performed in the fourth step.

In step S46, the controller 6a judges whether or not the measured charging time has reached the predetermined time. Specifically, when the process advances from step S44 to step S46, the controller 6a judges whether or not the charging time has reached the predetermined time Tf. When the process advances from step S45 to step S46, the controller 6a judges whether or not the charging time has reached the predetermined time (Tf+Tr).

When it is judged in step S46 that the measured charging time has not reached the predetermined time (NO in step S46), the charging is continued. When it is judged that the measured charging time has reached the predetermined time (YES in step S46), on the other hand, the controller 6a judges whether or not the count value Cv differs from the set number K (in this embodiment, K=5, for example) (step S47). When the count value Cv differs from the set number K (YES in step S47), the charging is terminated as is. When the count value Cv is equal to the set number K (NO in step S47), on the other hand, the count value Cv is reset to 0 (step S48). And then, the charging is terminated. As a result of this operation, the refresh charging is performed every time the normal charging is performed K times (in this embodiment, K=5, for example).

In the second embodiment, as described above, a temperature sensor is provided for each lead storage battery, and the highest battery temperature and the lowest battery temperature are obtained. Hence, the predetermined time Tf serving as the force-in charging time and the predetermined time Tr serving as the refresh charging time may be determined more favorably. Therefore, the lead storage battery having the lowest resistance value may be prevented from being overcharged. And, sulfation in the lead storage battery having the highest resistance value may be eliminated sufficiently. As a result, the assembled battery 4 may be charged favorably using the single charger 7.

Furthermore, in the second embodiment, the end-of-charge voltage Vth is set on the basis of the lowest battery temperature. Therefore, overcharging of the lead storage battery having the lowest resistance value may be prevented even more reliably.

Note that in FIG. 8, the charging is started after checking the charging condition in step S32, but the second embodiment is not limited thereto. For example, when the charging time T1 of step S40 in FIG. 8 is not more than a predetermined time (one minute, for example) following the start of the charging, the controller 6a may judge that the assembled battery 4 is in a fully charged condition and halt subsequent charging.

Furthermore, the controller 6 may check the charging condition in FIG. 5 of the first embodiment, similarly to step S32 in FIG. 8. Further, for example, when the charging time T1 of step S6 in FIG. 5 is not more than a predetermined time (one minute, for example) following the start of the charging, the controller 6 may judge that the assembled battery 4 is in a fully charged condition and halt subsequent charging. Alternatively, charging may be performed up to the second stage, and when a total charging time of the first stage and the second stage is not more than a predetermined time (one minute, for example), the controller 6 may judge that the assembled battery 4 is in a fully charged condition and halt subsequent charging.

Third Embodiment

Figure 10:
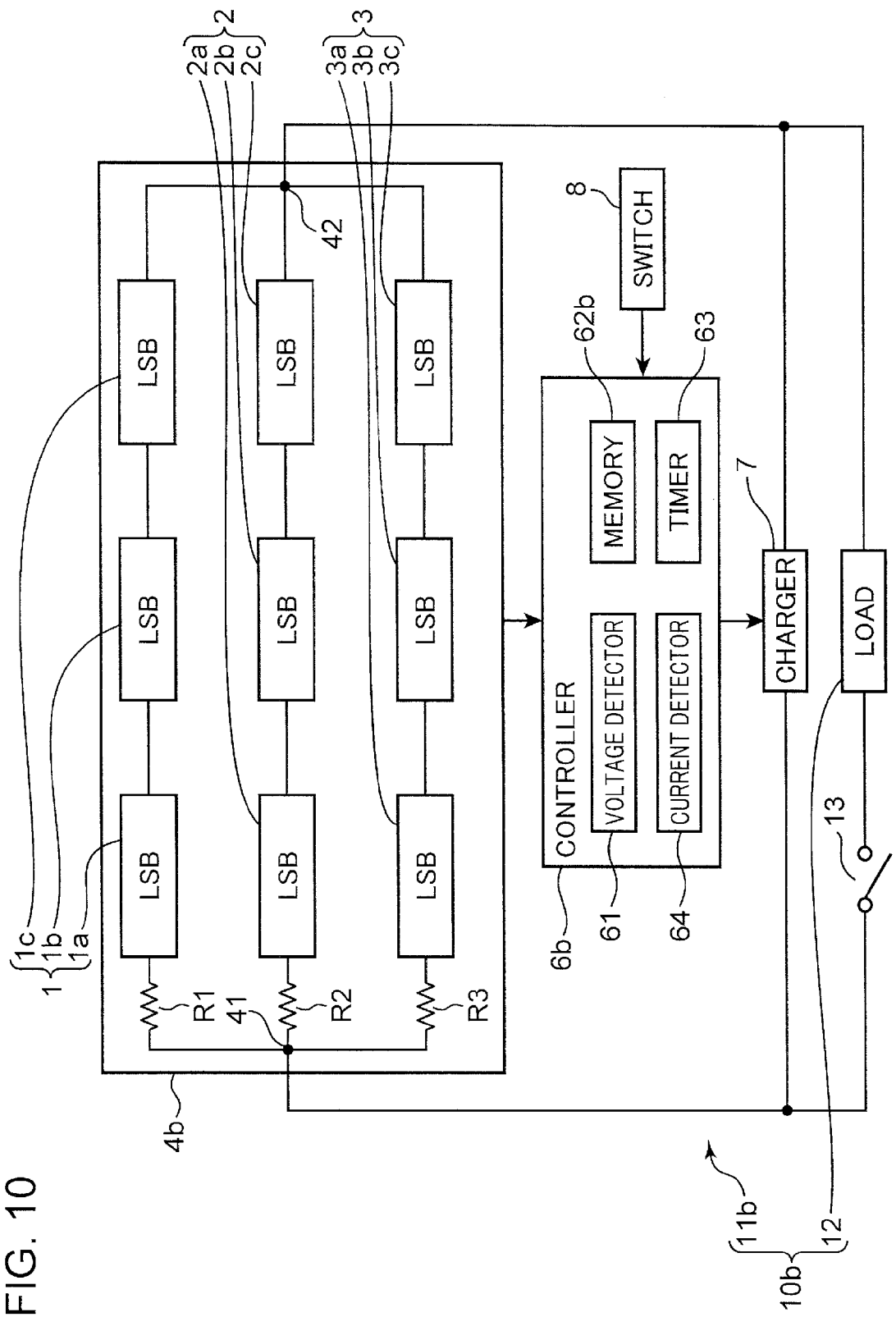
FIG. 10 is a block diagram schematically showing an example of a configuration of a battery-equipped device including a third embodiment of a power supply system.

FIG. 10 is a block diagram schematically showing an example of a configuration of a battery-equipped device including a third embodiment of a power supply system. FIG. 11 is a view showing a table for determining the force-in charging time Tf. FIG. 12 is a view showing a table for determining the refresh charging time Tr. In FIG. 10, identical elements to the first embodiment have been allocated identical reference symbols. The third embodiment will be described below while focusing on differences with the first embodiment.

A battery-equipped device 10b according to the third embodiment includes a power supply system 11b in place of the power supply system 11 provided in the battery-equipped device 10 of the first embodiment. The power supply system 11b of the third embodiment includes an assembled battery 4b and a controller 6b in place of the assembled battery 4 and the controller 6 of the power supply system 11 according to the first embodiment. The controller 6b of the third embodiment includes a memory 62b in place of the memory 62 of the controller 6 according to the first embodiment, and additionally includes a current detector 64.

The assembled battery 4b according to the third embodiment includes current detection resistors R1, R2, R3 respectively connected in series to the series circuits 1, 2, 3. Further, the assembled battery 4b is not provided with a temperature sensor for measuring the surface temperatures of the lead storage batteries. The current detector 64 of the controller 6b detects the respective charging current values of the series circuits 1, 2, 3 on the basis of a voltage drop in the current detection resistors R1, R2, R3. The memory 62b of the controller 6b stores the tables shown in FIGS. 11 and 12.

Similarly to the first embodiment, the controller 6b controls the charger 7 to perform the N-stage constant current charging (in the third embodiment, as in the first embodiment, N=5) shown in FIG. 2. The controller 6b calculates a resistance Rx=(Va−Vb)/(Ia−Ib) from a terminal voltage Va (=Vth) detected by the voltage detector 61 and a detected current value Ia detected by the current detector 64 immediately before a switch point (a time t6 in FIG. 2) from the third stage to the fourth stage, and a terminal voltage Vb detected by the voltage detector 61 and a detected current value Ib detected by the current detector 64 immediately after the switch. The controller 6b calculates the resistance Rx in relation to each of the series circuits 1 to 3.

The controller 6b selects a lowest resistance Rx1 (corresponding to an example of the first index value) and a highest resistance Rx2 (corresponding to an example of the second index value) from the calculated resistances Rx of the series circuits 1 to 3. The controller 6b then determines the predetermined time Tf serving as the charging time of the force-in charging by comparing the charging time T1 of the first stage, which is stored in the memory 62b, and the selected lowest resistance Rx1 with the table shown in FIG. 11. Further, the controller 6b determines the predetermined time Tr serving as the charging time of the refresh charging by comparing the charging time T1 of the first stage, which is stored in the memory 62b, and the selected highest resistance Rx2 with the table shown in FIG. 12.

Note that in FIG. 11, Tx11<Tx12<Tx13 is set, Tx21<Tx22<Tx23 is set, and Tx31<Tx32<Tx33 is set. Further, Tx11<Tx21<Tx31 is set, Tx12<Tx22<Tx32 is set, and Tx13<Tx23<Tx33 is set.

Furthermore, in FIG. 12, Tx41<Tx42<Tx43 is set, Tx51<Tx52<Tx53 is set, and Tx61<Tx62<Tx63 is set. Further, Tx41<Tx51<Tx61 is set, Tx42<Tx52<Tx62 is set, and Tx43<Tx53<Tx63 is set.

Also in the third embodiment, similarly to the first embodiment, the predetermined time Tf serving as the force-in charging time and the predetermined time Tr serving as the refresh charging time may be set favorably. As a result, the lead storage battery having the lowest resistance value may be prevented from being overcharged, and sulfation in the lead storage battery having the highest resistance value may be eliminated sufficiently.

Further, in the third embodiment, the respective resistances Rx of the series circuits 1 to 3 are determined instead of the surface temperatures of the lead storage batteries. Therefore, the predetermined time Tf and the predetermined time Tr may be determined even more favorably.

Fourth Embodiment

Figure 13:
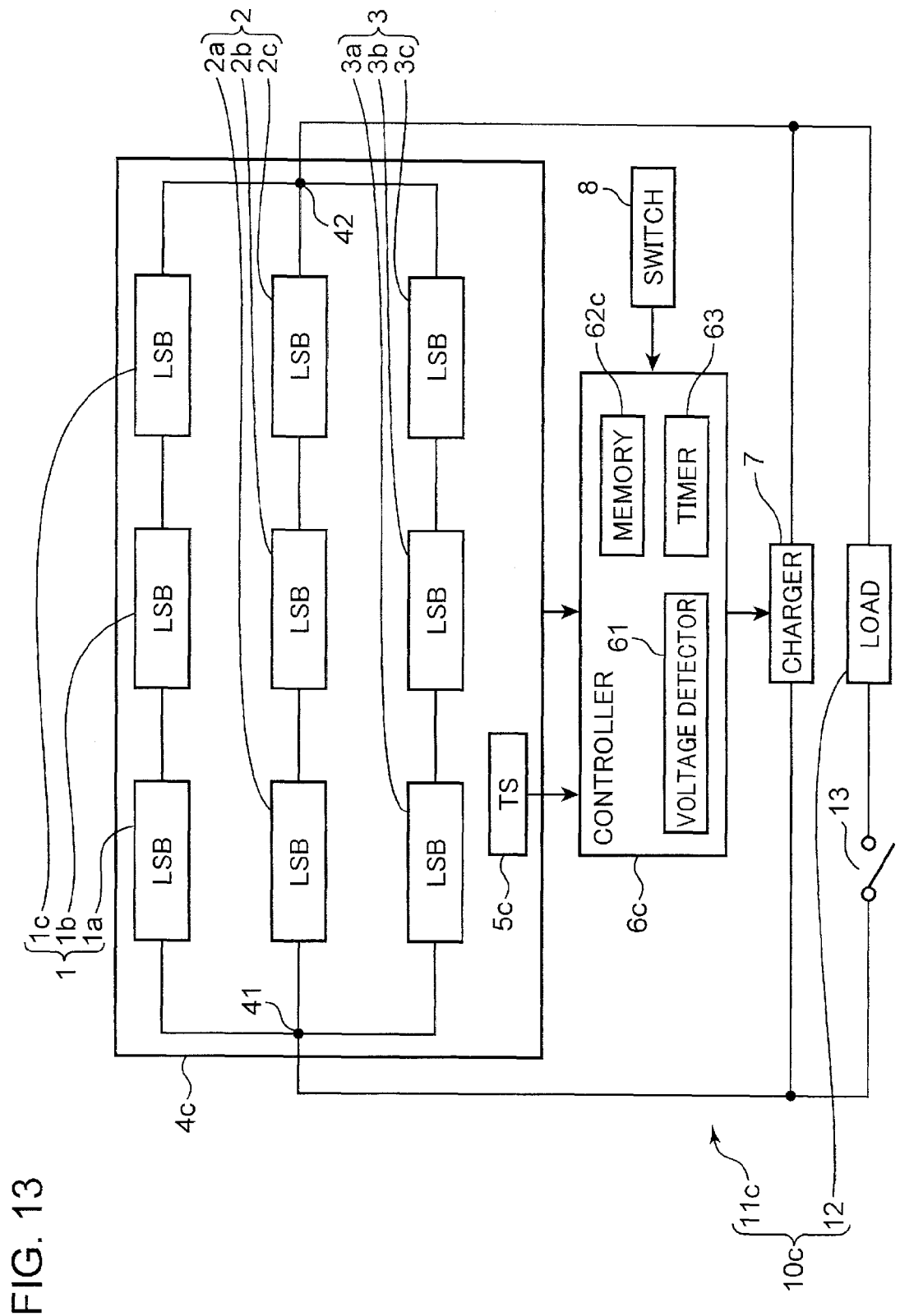
FIG. 13 is a block diagram schematically showing an example of a configuration of a battery-equipped device including a fourth embodiment of a power supply system.

FIG. 13 is a block diagram schematically showing an example of a configuration of a battery-equipped device including a fourth embodiment of a power supply system. In FIG. 13, identical elements to the first embodiment have been allocated identical reference symbols. The fourth embodiment will be described below while focusing on differences with the first embodiment.

A battery-equipped device 10c according to the fourth embodiment includes a power supply system 11c in place of the power supply system 11 provided in the battery-equipped device 10 of the first embodiment. The power supply system H c of the fourth embodiment includes an assembled battery 4c and a controller 6c respectively in place of the assembled battery 4 and the controller 6 provided in the power supply system 11 of the first embodiment. The controller 6c of the fourth embodiment includes a memory 62c in place of the memory 62 provided in the controller 6 of the first embodiment.

The assembled battery 4c of the fourth embodiment includes a temperature sensor 5c. The temperature sensor 5c detects an environmental temperature Ta of the assembled battery 4c. The temperature sensor 5c outputs the detected environmental temperature Ta to the controller 6c. Further, the assembled battery 4c is not provided with a temperature sensor for measuring the surface temperatures of the lead storage batteries.

The controller 6c adds a temperature difference ΔThi (ΔThi=30° C., for example) to the environmental temperature Ta detected by the temperature sensor 5c, and sets the result as the battery temperature Tp of the lead storage battery 2b. Then, similarly to the first embodiment, the controller 6c determines the predetermined time Tf serving as the charging time of the force-in charging on the basis of the battery temperature Tp and the table shown in FIG. 3, which is stored in the memory 62c.

The controller 6c adds a temperature difference ΔTlo (ΔTlo=10° C., for example) to the environmental temperature Ta detected by the temperature sensor 5c, and sets the result as the battery temperature Tp of the lead storage battery 3a. Then, similarly to the first embodiment, the controller 6c determines the predetermined time Tr serving as the charging time of the refresh charging on the basis of the battery temperature Tp and the table shown in FIG. 4, which is stored in the memory 62c. Here, the temperature differences ΔThi, ΔTlo are determined in advance by experiment, for example, and stored in the memory 62c.

Also in the fourth embodiment, similarly to the first embodiment, the predetermined time Tf serving as the force-in charging time and the predetermined time Tr serving as the refresh charging time may be determined favorably. Accordingly, the lead storage battery having the lowest resistance value may be prevented from being overcharged, and sulfation in the lead storage battery having the highest resistance value may be eliminated sufficiently. As a result, the assembled battery 4 may be charged favorably using the single charger 7.

Other Embodiments

In the above embodiments, the N-stage constant current charging is set such that N=5 in the first embodiment and N=2 in the second embodiment, but the N-stage constant current charging is not limited thereto, and may be set such that N=3, 4, 6, or more.

Further, in the above first embodiment, a temperature sensor that measures the surface temperature may also be attached to the lead storage battery 1a or 1c on the end of the series circuit 1. The controller 6 may then determine the refresh charging time Tr by selecting the lower of the battery temperature Tp of either the lead storage battery 1a or the lead storage battery 1c and the battery temperature Tp of the lead storage battery 3a as the battery temperature Tp2.

Furthermore, in the above embodiments, the set number K is set at K=5, but the above embodiments are not limited to K=5. K may be any integer of 1 or more. In other words, the refresh charging may be performed every time the normal charging is performed. Note, however, that by setting K at a large value within a range in which sulfation may be eliminated, the charging time may be shortened, which is preferable. Further, K need not take a fixed value. In other words, for example, the refresh charging may be performed after performing the normal charging five times, and then the refresh charging may be performed after performing the normal charging four times.

Examples

Figure 14:
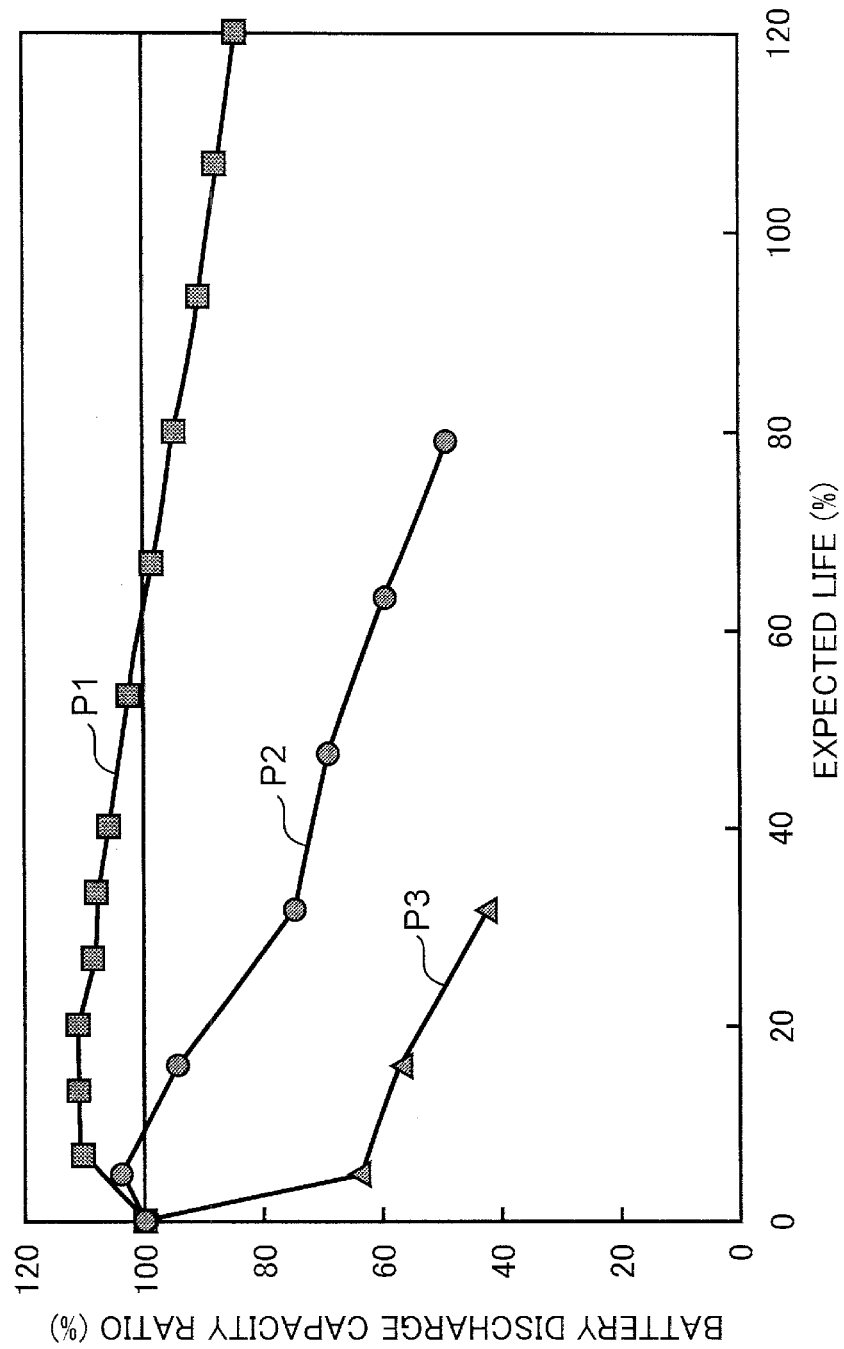
FIG. 14 is a view showing respective life characteristics of a working example and first and second comparative examples.

FIG. 14 is a view showing respective life characteristics of a working example and first and second comparative examples. Effects of the embodiments described above will be illustrated using the working example. The assembled battery 4 was configured similarly to the first embodiment (FIG. 1). EC-FV1260 (manufactured by Panasonic Storage Battery Co., Ltd.) having a nominal voltage of 12 V and a nominal capacity of 60 Ah was used as the lead storage batteries 1a to 3c. The temperature sensor 5a and the temperature sensor 5b were attached to the respective surfaces of the lead storage battery 3a and the lead storage battery 2b, and measured temperature values were output to the controller 6.

After discharging the assembled battery 4 from SOC=100% to SOC=50%, the normal charging was performed using the five-stage constant current charging shown in FIG. 2 (similarly to the first embodiment, first stage=0.2 C, second stage=0.1 C, third stage=0.05 C, fourth stage=fifth stage=0.025 C, end-of-charge voltage Vth=14.4 V) at an environmental temperature of 25° C. Note that since the assembled battery 4 was charged after being discharged to SOC=50%, the charging time T1 of the first stage was 1.9 h, which was within a range of 1.5≤T1<2.0.

Further, the constant current charging time of the fifth stage (the force-in charging time) Tf was determined by comparing the surface temperature of the lead storage battery 2b, measured by the temperature sensor 5b, with the table shown in FIG. 3. Similarly to the first embodiment, the refresh charging was performed once for every five normal charging operations. The refresh charging time Tr was determined by comparing the surface temperature of the lead storage battery 3a, measured by the temperature sensor 5a, with the table shown in FIG. 4. A life characteristic P1 obtained when this pattern (i.e. performing the refresh charging once for every five normal charging operations) was executed repeatedly is shown in FIG. 14.

In the first comparative example, in contrast to the working example, only the environmental temperature of 25° C., and not the respective surface temperatures of the lead storage batteries 3a and 2b, was reflected on the tables shown in FIGS. 3 and 4. Specifically, a force-in charging time Tf of Tf=1.5 was selected from FIG. 3, and a refresh charging time Tr of Tr=3.5 was selected from FIG. 4. Otherwise, the first comparative example was configured identically to the working example. A life characteristic P2 of the first comparative example is also shown in FIG. 14.

In the second comparative example, in contrast to the first comparative example, the refresh charging was not performed, and only the normal charging was performed. A life characteristic P3 of the second comparative example is also shown in FIG. 14.

As shown in FIG. 14, with regard to the life characteristic P1 of the working example, the ordinate shows a battery discharge capacity ratio (unit: %) having an initial capacity of 100%, and the abscissa shows an expected life (unit: %). The "expected life" is set such that a number of cycles required for the battery discharge capacity to become equivalent to an initial discharge capacity again due to deterioration after being increased by activation of the lead storage battery during ideal charging (when only one EC-FV1260 is charged using a single charger) corresponds to 100%. In other words, in FIG. 14, the life characteristic worsens steadily as the expected life diverges more rapidly from a straight line indicating "battery discharge capacity ratio=100%".

As is evident from FIG. 14, the life characteristic P2 of the first comparative example, in which the refresh charging is performed, although better than the life characteristic P3 of the second comparative example, is still not sufficient. The assembled battery 4 is configured by connecting the series circuits 1 to 3 in parallel, and therefore thermal environments to which the series circuits 1 to 3 are exposed vary even when the environmental temperature remains constant. There is therefore a limit to the increase in life that is achieved by controlling charging on the basis of the environmental temperature alone using the single charger.

When, on the other hand, variation in the thermal environment is taken into account, as in the working example, such that the temperatures of lead storage batteries in appropriate locations are measured and reflected individually in the normal charging (the force-in charging in the normal charging)

and the refresh charging, respectively, an increase in life is achieved even when the single charger 7 is used.

Note that the specific embodiments and examples described above mainly include inventions having the following configurations.

An assembled battery charging method according to an aspect of the present invention is a method for charging an assembled battery using a single charger, the assembled battery including series circuits, each of the series circuits including one or more lead storage batteries connected in series, the series circuits being connected in parallel, the method includes: a first step of obtaining a first index value, which is an index value corresponding to a resistance value of a first series circuit with a correlative relationship, the first series circuit having a lowest resistance value among the series circuits; a second step of obtaining a second index value, which is an index value corresponding to a resistance value of a second series circuit with a correlative relationship, the second series circuit having a highest resistance value among the series circuits; a third step of performing normal charging, in which the assembled battery is charged with a first amount of charge corresponding to the first index value; and a fourth step of performing refresh charging, in which the assembled battery is charged with a second amount of charge corresponding to the second index value, in succession to the third step.

According to this configuration, the first index value, which is an index value corresponding to a resistance value of a first series circuit with a correlative relationship, is obtained in the first step. The first series circuit has a lowest resistance value among the series circuits. The second index value, which is an index value corresponding to a resistance value of a second series circuit with a correlative relationship, is obtained in the second step. The second series circuit has a highest resistance value among the series circuits. The normal charging, in which the assembled battery is charged with the first amount of charge corresponding to the first index value, is performed in the third step. The refresh charging, in which the assembled battery is charged with the second amount of charge corresponding to the second index value, is performed in the fourth step in succession to the third step.

In this way, the normal charging is performed to charge the assembled battery with the first amount of charge corresponding to the first index value. Therefore, overcharging of the lead storage batteries included in the first series circuit, which has the lowest resistance value, may be suppressed by the normal charging. Further, the refresh charging is performed with the second amount of charge corresponding to the second index value. Therefore, sulfation of the lead storage batteries included in the second series circuit, which has the highest resistance value, may be eliminated favorably by the refresh charging. As a result, the assembled battery may be charged favorably using the single charger.

In the assembled battery charging method, the fourth step may be executed once after the third step is executed plural times.

According to this configuration, the fourth step is executed once after the third step is executed plural times. Therefore, the refresh charging may be performed at a favorable frequency.

In the assembled battery charging method, the first amount of charge in the third step may be set larger as the resistance value corresponding to the first index value increases.

According to this configuration, the first amount of charge in the third step is set larger as the resistance value corresponding to the first index value increases. As a result, the normal charging may be performed favorably with the first amount of charge corresponding to the magnitude of the resistance value of the lead storage battery.

In the assembled battery charging method, the second amount of charge in the fourth step may be set larger as the resistance value corresponding to the second index value increases.

According to this configuration, the second amount of charge in the fourth step is set larger as the resistance value corresponding to the second index value increases. As a result, the refresh charging may be performed favorably with the second amount of charge corresponding to the magnitude of the resistance value of the lead storage battery.

In the assembled battery charging method, N-stage constant current charging may be performed as the normal charging in the third step, constant current charging of a first stage in the N-stage constant current charging may be started with a predetermined charging current value, constant current charging of respective stages of the first stage to an (N−1)th stage (where N is an integer of not less than 2) in the N-stage constant current charging may be performed in turn, with a charging current value being reduced when a stage is advanced to a next stage, the stage being advanced to the next stage when a voltage of the assembled battery reaches a predetermined end-of-charge voltage Vth, and constant current charging of an Nth stage in the N-stage constant current charging may be performed for a predetermined time Tf with a current value lower than or substantially identical to a charging current value in the (N−1)th stage, the (N−1)th stage being advanced to the Nth stage when the voltage of the assembled battery reaches the end-of-charge voltage Vth in the (N−1)th stage.

According to this configuration, N-stage constant current charging is performed as the normal charging in the third step. Constant current charging of a first stage in the N-stage constant current charging is started with a predetermined charging current value. Constant current charging of respective stages of the first stage to an (N−1)th stage (where N is an integer of not less than 2) in the N-stage constant current charging are performed in turn, with a charging current value being reduced when a stage is advanced to a next stage, the stage being advanced to the next stage when a voltage of the assembled battery reaches a predetermined end-of-charge voltage Vth. And, constant current charging of an Nth stage in the N-stage constant current charging is performed for a predetermined time Tf with a current value lower than or substantially identical to a charging current value in the (N−1)th stage, the (N−1)th stage being advanced to the Nth stage when the voltage of the assembled battery reaches the end-of-charge voltage Vth in the (N−1)th stage. Accordingly, by executing N-stage constant current charging as the normal charging, charging may be performed with a sufficient amount of charge in a comparatively short time.

In the assembled battery charging method, the third step may include a fifth step of determining the predetermined time Tf based on the first index value.

According to this configuration, the predetermined time Tf is determined based on the first index value in the fifth step. Therefore, the first amount of charge may be determined easily.

In the assembled battery charging method, the fourth step may include a step of performing constant current charging as the refresh charging for a predetermined time Tr following an elapse of the predetermined time Tf, with a current value substantially identical to a charging current value in the constant current charging of the Nth stage performed in the third step.

According to this configuration, the fourth step includes a step of performing constant current charging as the refresh charging for a predetermined time Tr following an elapse of the predetermined time Tf, with a current value substantially identical to a charging current value in the constant current charging of the Nth stage performed in the third step. Hence, the charging current value in the refresh charging is comparatively small. As a result, the likelihood of adverse effects such as grid corrosion occurring in the positive electrode due to overcharging may be reduced.

In the assembled battery charging method, the fourth step may include a sixth step of determining the predetermined time Tr based on the second index value.

According to this configuration, the predetermined time Tr is determined based on the second index value in the sixth step. Therefore, the second amount of charge may be determined easily.

In the assembled battery charging method, the predetermined time Tr may be set longer as the resistance value corresponding to the second index value increases.

According to this configuration, the predetermined time Tr for which the refresh charging is performed is set longer as the resistance value corresponding to the second index value increases. Hence, the second amount of charge, which is the amount of charge during the refresh charging, increases as the resistance value of the second series circuit increases. As a result, sulfation in the lead storage battery having a high resistance value may be eliminated sufficiently.

In the assembled battery charging method, the end-of-charge voltage Vth may be set to correspond to the first index value.

According to this configuration, the end-of-charge voltage Vth is set to correspond to the first index value. Therefore, the amount of charge during the N-stage constant current charging, that is, the first amount of charge of the normal charging, may be set to a favorable amount.

In the assembled battery charging method, the end-of-charge voltage Vth may be set higher as the resistance value corresponding to the first index value increases.

According to this configuration, the end-of-charge voltage Vth is set higher as the resistance value corresponding to the first index value increases. Therefore, the amount of charge during the N-stage constant current charging, that is, the first amount of charge of the normal charging, may be set to an amount corresponding to the magnitude of the resistance value.

In the assembled battery charging method, a surface temperature of the lead storage battery included in the first series circuit may be obtained as the first index value in the first step, and a surface temperature of the lead storage battery included in the second series circuit may be obtained as the second index value in the second step.

According to this configuration, the surface temperature of the lead storage battery included in the first series circuit is obtained as the first index value in the first step. The surface temperature of the lead storage battery included in the second series circuit is obtained as the second index value in the second step. As the surface temperature of the lead storage battery increases, the reaction resistance of the lead storage battery decreases. Hence, by obtaining the surface temperature of the lead storage battery, the first index value and the second index value may be obtained favorably. Further, the surface temperature of the lead storage battery may be detected easily. Therefore, the first index value and the second index value may be obtained easily.

In the assembled battery charging method, the first amount of charge in the third step may be set larger as the surface temperature of the lead storage battery obtained as the first index value decreases, and the second amount of charge in the fourth step may be set larger as the surface temperature of the lead storage battery obtained as the second index value decreases.

According to this configuration, the first amount of charge in the third step is set larger as the surface temperature of the lead storage battery obtained as the first index value decreases. The second amount of charge in the fourth step is set larger as the surface temperature of the lead storage battery obtained as the second index value decreases. As the surface temperature of the lead storage battery increases, the reaction resistance of the lead storage battery decreases. Hence, according to the above-described configuration, the normal charging may be performed favorably with the first amount of charge corresponding to the magnitude of the resistance value of the lead storage battery. And, the refresh charging may be performed favorably with the second amount of charge corresponding to the magnitude of the resistance value of the lead storage battery.

A charging control circuit according to an aspect of the present invention charges an assembled battery using a single charger, the assembled battery including series circuits connected in parallel, each of the series circuits including one or more lead storage batteries connected in series, the circuit includes: an acquisition portion which obtains a first index value and a second index value, the first index value being an index value corresponding to a resistance value of a first series circuit with a correlative relationship, the first series circuit having a lowest resistance value among the series circuits, the second index value being an index value corresponding to a resistance value of a second series circuit with a correlative relationship, the second series circuit having a highest resistance value among the series circuits; and a charging controller which controls the single charger to perform normal charging, in which the assembled battery is charged with a first amount of charge corresponding to the first index value, and to perform refresh charging, in which the assembled battery is charged with a second amount of charge corresponding to the second index value, in succession to the normal charging.

According to this configuration, the first index value which is an index value corresponding to a resistance value of a first series circuit with a correlative relationship is obtained by the acquisition portion. The first series circuit has a lowest resistance value among the series circuits. The second index value which is an index value corresponding to a resistance value of a second series circuit with a correlative relationship is obtained by the acquisition portion. The second series circuit has a highest resistance value among the series circuits. The single charger is controlled by the charging controller to perform the normal charging, in which the assembled battery is charged with the first amount of charge corresponding to the first index value. Further, the refresh charging, in which the assembled battery is charged with the second amount of charge corresponding to the second index value, is performed by the charging controller in succession to the normal charging.

In this way, the normal charging is performed with the first amount of charge corresponding to the first index value. Therefore, overcharging of the lead storage batteries included in the first series circuit, which has the lowest resistance value, may be suppressed by the normal charging. Further, the refresh charging is performed with the second amount of charge corresponding to the second index value. Therefore, sulfation of the lead storage batteries included in the second series circuit, which has the highest resistance value, may be eliminated favorably by the refresh charging. As a result, the assembled battery may be charged favorably using the single charger.

A power supply system according to an aspect of the present invention includes: an assembled battery which includes series circuits, each of the series circuits including one or more lead storage batteries connected in series, the series circuits being connected in parallel; a single charger which charges the assembled battery; and the above-described charging control circuit which controls the single charger.

According to this configuration, the assembled battery is formed by connecting series circuits in parallel. Each of the series circuits includes one or more lead storage batteries connected in series. The assembled battery is charged by a single charger. The single charger is controlled by the above-described charging control circuit. Hence, overcharging of the lead storage batteries included in the first series circuit having the lowest resistance value may be suppressed by the normal charging. And, sulfation of the lead storage batteries included in the second series circuit having the highest resistance value may be eliminated favorably by the refresh charging. As a result, the assembled battery may be charged favorably using the single charger.

INDUSTRIAL APPLICABILITY

By employing the present invention, an electric vehicle that uses a lead storage battery as a main power supply may be reduced in cost. The present invention is therefore not only highly applicable industrially, but also extremely useful.

The invention claimed is:

1. An assembled battery charging method for charging an assembled battery using a single charger, the assembled battery including series circuits, each of the series circuits including one or more lead storage batteries connected in series, the series circuits being connected in parallel, the method comprising:
   a first step of obtaining a first index value, which is an index value corresponding to a resistance value of a first series circuit with a correlative relationship, the first series circuit having a lowest resistance value among the series circuits;
   a second step of obtaining a second index value, which is an index value corresponding to a resistance value of a second series circuit with a correlative relationship, the second series circuit having a highest resistance value among the series circuits, the first series circuit and the second series circuit being connected in parallel;
   a third step of performing normal charging, in which the assembled battery is charged with a first amount of charge corresponding to the first index value; and
   a fourth step of performing refresh charging, in which the assembled battery is charged with a second amount of charge corresponding to the second index value, in succession to the third step.

2. The assembled battery charging method according to claim 1, wherein the fourth step is executed once after the third step is executed plural times.

3. The assembled battery charging method according to claim 1, wherein the first amount of charge in the third step is set larger as the resistance value corresponding to the first index value increases.

4. The assembled battery charging method according to claim 1, wherein the second amount of charge in the fourth step is set larger as the resistance value corresponding to the second index value increases.

5. The assembled battery charging method according to claim 1, wherein
   N-stage constant current charging is performed as the normal charging in the third step,
   constant current charging of a first stage in the N-stage constant current charging is started with a predetermined charging current value,
   constant current charging of respective stages of the first stage to an (N−1)th stage (where N is an integer of not less than 2) in the N-stage constant current charging are performed in turn, with a charging current value being reduced when a stage is advanced to a next stage, the stage being advanced to the next stage when a voltage of the assembled battery reaches a predetermined end-of-charge voltage Vth, and
   constant current charging of an Nth stage in the N-stage constant current charging is performed for a predetermined time Tf with a current value lower than or substantially identical to a charging current value in the (N−1)th stage, the (N−1)th stage being advanced to the Nth stage when the voltage of the assembled battery reaches the end-of-charge voltage Vth in the (N−1)th stage.

6. The assembled battery charging method according to claim 5, wherein the third step includes a fifth step of determining the predetermined time Tf based on the first index value.

7. The assembled battery charging method according to claim 5, wherein the fourth step includes a step of performing constant current charging as the refresh charging for a predetermined time Tr following an elapse of the predetermined time Tf, with a current value substantially identical to a charging current value in the constant current charging of the Nth stage performed in the third step.

8. The assembled battery charging method according to claim 7, wherein the fourth step includes a sixth step of determining the predetermined time Tr based on the second index value.

9. The assembled battery charging method according to claim 7, wherein the predetermined time Tr is set longer as the resistance value corresponding to the second index value increases.

10. The assembled battery charging method according to claim 5, wherein the end-of-charge voltage Vth is set to correspond to the first index value.

11. The assembled battery charging method according to claim 10, wherein the end-of-charge voltage Vth is set higher as the resistance value corresponding to the first index value increases.

12. The assembled battery charging method according to claim 1, wherein
   a surface temperature of the lead storage battery included in the first series circuit is obtained as the first index value in the first step, and
   a surface temperature of the lead storage battery included in the second series circuit is obtained as the second index value in the second step.

13. The assembled battery charging method according to claim 12, wherein
   the first amount of charge in the third step is set larger as the surface temperature of the lead storage battery obtained as the first index value decreases, and
   the second amount of charge in the fourth step is set larger as the surface temperature of the lead storage battery obtained as the second index value decreases.

14. A charging control circuit which charges an assembled battery using a single charger, the assembled battery including series circuits, each of the series circuits including one or more lead storage batteries connected in series, the series circuits being connected in parallel, the circuit comprising:

an acquisition portion which obtains a first index value and a second index value, the first index value being an index value corresponding to a resistance value of a first series circuit with a correlative relationship, the first series circuit having a lowest resistance value among the series circuits, the second index value being an index value corresponding to a resistance value of a second series circuit with a correlative relationship, the second series circuit having a highest resistance value among the series circuits, the first series circuit and the second series circuit being connected in parallel; and a charging controller which controls the single charger to perform normal charging, in which the assembled battery is charged with a first amount of charge corresponding to the first index value, and to perform refresh charging, in which the assembled battery is charged with a second amount of charge corresponding to the second index value, in succession to the normal charging.

15. A power supply system comprising:

an assembled battery which includes series circuits, each of the series circuits including one or more lead storage batteries connected in series, the series circuits being connected in parallel;

a single charger which charges the assembled battery; and the charging control circuit according to claim 14 which controls the single charger.

16. The charging control circuit according to claim 14, wherein the charging controller is configured to:
(i) perform N-stage constant current charging as the normal charging, where N is an integer of not less than 2,
(ii) start constant current charging of a first stage in the N-stage constant current charging with a predetermined charging current value,
(iii) perform constant current charging of respective stages of the first stage to an (N−1)th stage, in the N-stage constant current charging in turn, with a charging current value being reduced when a stage is advanced to a next stage, the stage being advanced to the next stage when a voltage of the assembled battery reaches a predetermined end-of-charge voltage Vth,
(iv) perform constant current charging of an Nth stage in the N-stage constant current charging for a predetermined time Tf with a current value lower than or substantially identical to a charging current value in the (N−1)th stage, the (N−1)th stage being advanced to the Nth stage when the voltage of the assembled battery reaches the end-of-charge voltage Vth in the (N−1)th stage, and
(v) determine the predetermined time Tf based on the first index value.

* * * * *